US011284766B2

(12) United States Patent
Jang et al.

(10) Patent No.: US 11,284,766 B2
(45) Date of Patent: Mar. 29, 2022

(54) ROBOT CLEANER AND MAINTENANCE DEVICE FOR THE SAME

(71) Applicant: LG ELECTRONICS INC., Seoul (KR)

(72) Inventors: Jaewon Jang, Seoul (KR); Minwoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 16/478,743

(22) PCT Filed: Jan. 19, 2018

(86) PCT No.: PCT/KR2018/000891
§ 371 (c)(1),
(2) Date: Jul. 17, 2019

(87) PCT Pub. No.: WO2018/135898
PCT Pub. Date: Jul. 26, 2018

(65) Prior Publication Data
US 2019/0328198 A1  Oct. 31, 2019

(30) Foreign Application Priority Data

Jan. 19, 2017  (KR) ........................ 10-2017-0009365

(51) Int. Cl.
*A47L 11/283* (2006.01)
*A47L 11/293* (2006.01)
(Continued)

(52) U.S. Cl.
CPC ............. *A47L 11/283* (2013.01); *A47L 9/009* (2013.01); *A47L 9/0606* (2013.01);
(Continued)

(58) Field of Classification Search
CPC ...... A47L 11/283; A47L 9/009; A47L 9/0606; A47L 9/2826; A47L 9/2852; A47L 11/14;
(Continued)

(56) References Cited

U.S. PATENT DOCUMENTS 7,346,428 B1  3/2008  Huffman et al.
8,898,844 B1  12/2014  Dooley et al.
(Continued)

FOREIGN PATENT DOCUMENTS

| CN | 104586324 A | 5/2015 |
| CN | 204797752 U | 11/2015 |

(Continued)

OTHER PUBLICATIONS

European Search Report, dated Aug. 12, 2020, issued in European Patent Application No. 18741017.0 (7 pages).
(Continued)

*Primary Examiner* — David Redding
(74) *Attorney, Agent, or Firm* — Finnegan, Henderson, Farabow, Garrett & Dunner, LLP

(57) ABSTRACT

Disclosed is a robot cleaner including a body having a module location portion, a traveling module for moving the body, and a sliding module having a body location portion detachably coupled to the module location portion, the sliding module being configured to slide along a floor when the body is moved. A mop fixing unit for fixing a replaceable mop is provided between the module location portion and the body location portion.

18 Claims, 29 Drawing Sheets

(51) Int. Cl.

| | |
|---|---|
| A47L 11/14 | (2006.01) |
| A47L 11/282 | (2006.01) |
| A47L 11/292 | (2006.01) |
| B25J 9/16 | (2006.01) |
| B25J 11/00 | (2006.01) |
| A47L 9/00 | (2006.01) |
| A47L 9/06 | (2006.01) |
| A47L 11/20 | (2006.01) |
| B25J 9/00 | (2006.01) |
| B25J 9/12 | (2006.01) |
| A47L 13/20 | (2006.01) |
| B08B 3/04 | (2006.01) |
| B08B 3/08 | (2006.01) |
| A47L 11/40 | (2006.01) |
| A47L 11/16 | (2006.01) |
| A47L 11/34 | (2006.01) |
| G05D 1/02 | (2020.01) |
| B25J 5/00 | (2006.01) |
| B08B 1/04 | (2006.01) |
| A47L 9/28 | (2006.01) |
| A47L 11/24 | (2006.01) |
| A47L 11/00 | (2006.01) |

(52) U.S. Cl.
CPC ........... *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01); *A47L 11/40* (2013.01); *A47L 11/4002* (2013.01); *A47L 11/4005* (2013.01); *A47L 11/405* (2013.01); *A47L 11/408* (2013.01); *A47L 11/4011* (2013.01); *A47L 11/4013* (2013.01); *A47L 11/4038* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/4083* (2013.01); *A47L 11/4088* (2013.01); *A47L 13/20* (2013.01); *B08B 1/04* (2013.01); *B08B 3/041* (2013.01); *B08B 3/08* (2013.01); *B25J 5/007* (2013.01); *B25J 9/0003* (2013.01); *B25J 9/126* (2013.01); *B25J 9/1664* (2013.01); *B25J 9/1666* (2013.01); *B25J 11/0085* (2013.01); *G05D 1/0223* (2013.01); *A47L 11/00* (2013.01); *A47L 11/145* (2013.01); *A47L 2201/00* (2013.01); *A47L 2201/04* (2013.01); *A47L 2201/06* (2013.01); *B08B 2203/00* (2013.01); *G05D 2201/0203* (2013.01)

(58) Field of Classification Search
CPC ........ A47L 11/16; A47L 11/161; A47L 11/20; A47L 11/201; A47L 11/24; A47L 11/282; A47L 11/292; A47L 11/293; A47L 11/34; A47L 11/40; A47L 11/4002; A47L 11/4005; A47L 11/4011; A47L 11/4013; A47L 11/4038; A47L 11/405; A47L 11/4058; A47L 11/4061; A47L 11/4066; A47L 11/4069; A47L 11/4072; A47L 11/408; A47L 11/4083; A47L 11/4088; A47L 13/20; A47L 11/00; A47L 11/145; A47L 2201/00; A47L 2201/04; A47L 2201/06; B08B 1/04; B08B 3/041; B08B 3/08; B08B 2203/00; B25J 5/007; B25J 9/0003; B25J 9/126; B25J 9/1664; B25J 9/1666; B25J 11/0085; G05D 1/0223; G05D 2201/0203
See application file for complete search history.

(56) References Cited

U.S. PATENT DOCUMENTS

| | | |
|---|---|---|
| 2004/0031113 A1 | 2/2004 | Wosewick et al. |
| 2004/0049877 A1 | 3/2004 | Jones et al. |

FOREIGN PATENT DOCUMENTS

| | | |
|---|---|---|
| CN | 205181248 U | 4/2016 |
| JP | 2013-244225 A | 12/2013 |
| JP | 2015-192878 A | 11/2015 |
| KR | 20-0322361 U | 8/2003 |
| KR | 10-2007-0101432 | 10/2007 |
| KR | 10-2011-0105305 | 9/2011 |
| KR | 10-2012-0015477 | 2/2012 |
| KR | 10-2014-0070250 | 6/2014 |
| KR | 10-1558509 | 10/2015 |
| KR | 10-2015-0139111 | 12/2015 |
| KR | 10-2015-0143208 | 12/2015 |
| TW | 1712388 B | 12/2020 |
| WO | WO 2006/046053 A1 | 5/2006 |

OTHER PUBLICATIONS

Korean Notice of Allowance, dated Mar. 29, 2019, issued by the Korean Patent Office in Korean Patent Application No. 10-2017-0009365 (2 pages).

PCT Search Report, dated May 21, 2018, issued in PCT International Patent Application No. PCT/KR2018/000891 (3 pages).

Chinese Office Action (and translation), dated Nov. 23, 2020, issued in Chinese Patent Application No. 201880019375.9 (10 pages).

ROBOT CLEANER AND MAINTENANCE DEVICE FOR THE SAME

TECHNICAL FIELD

The present invention relates to a robot cleaner capable of performing a mopping operation and a maintenance device for the same.

BACKGROUND ART

A robot cleaner is an apparatus that cleans a floor by suctioning foreign matter, such as dust, from the floor or sweeping away foreign matter on the floor while traveling autonomously. In recent years, there have been developed robot cleaners capable of performing a mopping operation.

A mop is made of various materials, such as fabric or paper. The mop may be washable for repeated use or disposable.

When the robot cleaner performs a mopping operation, some foreign matter easily clings to the surface of the mop. However, bulky foreign matter does not easily cling to the surface of the mop.

TECHNICAL PROBLEM

It is a first object of the present invention to provide a robot cleaner capable of performing an efficient and clean mopping operation.

It is necessary to detach a mop from the robot cleaner in order to wash the mop or to replace the mop with a new one after the robot cleaner performs a mopping operation. It is a second object of the present invention to provide a robot cleaner that makes it easy to replace a mop.

A mop is attached to the lower side of a conventional robot cleaner. In order for a user to replace the mop, therefore, the user must overturn the entire robot cleaner, separate the mop from the robot cleaner, and attach a new mop to the robot cleaner, which is inconvenient. It is a third object of the present invention to provide a robot cleaner capable of improving user convenience.

In addition, when the user overturns the entire robot cleaner and replaces the mop, it is difficult for the user to tightly and uniformly fix a new mop to the robot cleaner due to the weight of the robot cleaner, whereby mopping performance is lowered due to inaccurate fixing of the mop. It is a fourth object of the present invention to provide a robot cleaner capable of enabling a user to easily fix a mop to the robot cleaner.

If the replaceable mop is weakly fixed to the robot cleaner, the mop may become separated from the robot cleaner during a mopping operation of the robot cleaner. If the replaceable mop is strongly fixed to the robot cleaner, a large amount of time or effort is required to detach the replaceable mop from the robot cleaner, which is inconvenient. It is a fifth object of the present invention to provide a robot cleaner capable of enabling a user to easily replace a replaceable mop that is strongly fixed to the robot cleaner for a mopping operation of the robot cleaner.

During a mopping operation of the robot cleaner, relatively large particulate foreign matter does not easily cling to the surface of a mop, whereby the foreign matter remains on the floor after the mopping operation of the robot cleaner. It is a sixth object of the present invention to provide a robot cleaner capable of removing relatively large particulate foreign matter.

When the robot cleaner moves forward in the state in which the mop is in contact with the floor, air flows from the front end of a contact region between the mop and the floor along the circumference of the contact region. Micro-scale foreign matter may fly away without clinging to the mop due to this flow of air, whereby the performance of a mopping operation to remove micro-scale foreign matter is lowered. It is a seventh object of the present invention to provide a robot cleaner capable of improving the performance of a mopping operation to remove micro-scale foreign matter.

It is an eighth object of the present invention to provide a robot cleaner capable of both a wet mopping operation and dry cleaning (a dry mopping operation and/or suction cleaning), thereby performing a thorough and efficient mopping operation.

TECHNICAL SOLUTION

In order to achieve the first to fifth objects, a robot cleaner includes a body having a module location portion, a traveling module for moving the body, and a sliding module having a body location portion detachably coupled to the module location portion, the sliding module being configured to slide along a floor when the body is moved. A mop fixing unit for fixing a replaceable mop is provided between the module location portion and the body location portion.

In order to achieve the fifth object, the sliding module may be configured to support the body.

In order to achieve the fifth object, the module location portion may have a surface that faces downward, and the body location portion may have a surface that faces upward.

In order to achieve the fifth object, the module location portion or the body location portion may be configured to push the mop fixing unit in the state in which the sliding module is coupled to the body.

In order to achieve the third and fourth objects, the mop fixing unit may be disposed at the body location portion.

In order to achieve the fifth object, the mop fixing unit may have a friction-forming surface that provides relatively high frictional force in the state in which the mop is in contact with the friction-forming surface.

In order to achieve the second to fifth objects, any one of the module location portion and the body location portion may be provided with a guide protrusion having a vertically protruding portion, and the other of the module location portion and the body location portion may be provided with a guide, into which the guide protrusion is inserted.

In order to achieve the second to fifth objects, the mop fixing unit may include a front mop fixing unit disposed in front of the guide protrusion and the guide and a rear mop fixing unit disposed at the rear of the guide protrusion and the guide.

In order to achieve the second to fifth objects, the sliding module may include a coupling unit disposed at the body location portion, and the body may include a corresponding coupling unit disposed at the module location portion at a position corresponding to the coupling unit, the corresponding coupling unit being coupled to the coupling unit to generate coupling force. The coupling unit may include a front coupling unit, disposed on the same axis in a leftward-rightward direction as the front mop fixing unit or disposed further forward than the front mop fixing unit, and a rear coupling unit, disposed on the same axis in a leftward-rightward direction as the rear mop fixing unit or disposed further rearward than the rear mop fixing unit.

In order to achieve the second to fifth and seventh objects, an air channel may be formed through the guide protrusion and the guide.

In order to achieve the second to fifth objects, the sliding module may include a coupling unit disposed at the body location portion, and the body may include a corresponding coupling unit disposed at the module location portion at a position corresponding to the coupling unit. Any one of the coupling unit and the corresponding coupling unit may include a magnet, and the other of the coupling unit and the corresponding coupling unit may include a material that is attracted by the magnet.

In order to achieve the second to fifth objects, any one of the module location portion and the body location portion may be provided with a guide protrusion, and the other of the module location portion and the body location portion may be provided with a guide, into which the guide protrusion is inserted. The coupling unit may include a front coupling unit disposed in front of the guide protrusion and the guide and a rear coupling unit disposed at the rear of the guide protrusion and the guide.

In order to achieve the sixth object, the sliding module may include a collection portion recessed in front of the lower side thereof so as to define a space spaced apart from the floor.

In order to achieve the seventh object, the robot cleaner may further include an air channel for discharging air introduced from the sliding module to the outside through the body in the state in which the sliding module is coupled to the body.

In order to achieve the second to fifth and seventh objects, the sliding module may be provided with a module hole formed through the body location portion. The body may be provided with an air channel for interconnecting a first channel end disposed at a position corresponding to the module hole and a second channel end disposed so as to be exposed to external air in the state in which the sliding module is coupled to the body.

In order to achieve the seventh object, the body may have a body gap, the outer surface of which is recessed, and the second channel end may be disposed at a position facing the body gap.

In order to achieve the second to fifth objects, the body may include a bumper disposed in front of the module location portion and a cliff sensor for sensing if there is a cliff in front of the module location portion.

In order to achieve the first and eighth objects, the traveling module may include a left spin-mop and a right spin-mop configured to contact the floor while rotating in a clockwise direction or in a counterclockwise direction when viewed from upper side. The robot cleaner may further include a water supply module for supplying water to the traveling module. The traveling module may be configured to perform a wet mopping operation, and the sliding module may be configured to perform a dry mopping operation.

BRIEF DESCRIPTION OF DRAWINGS

The accompanying drawings, which are included to provide a further understanding of the invention and which are incorporated in and constitute a part of this application, illustrate embodiments of the invention and together with the description serve to explain the principle of the invention. In the drawings:

FIGS. 15a to 15c are sectional views taken along line S3-S3' of FIG. 13 and line S4-S4' of FIG. 14, showing a process of fixing a replaceable mop and a process of coupling the module location portion and the sliding module, wherein FIG. 15a shows the state in which the module location portion and the sliding module are separated from each other, FIG. 15b shows the state in which the sliding module is wrapped with the replaceable mop, and FIG. 15c shows the state in which the module location portion and the sliding module are coupled to each other;

FIGS. 16a and 16b are sectional views showing a process in which the sliding module of FIG. 15c mops a floor, wherein FIG. 16a shows that when the sliding module moves forward, foreign matter is introduced into a collection portion and air flows through an air channel, and FIG. 16b shows that when the sliding module moves rearward, foreign matter is prevented from being discharged from the collection portion;

FIGS. 23a to 24b are sectional views taken along line S6-S6' of FIG. 20 in the state in which the sliding module is coupled to the module location portion, wherein FIGS. 23a and 23b show that the robot cleaner performs a mopping operation using the replaceable mop in the state in which the replaceable mop is fixed, FIGS. 24a and 24b show that the robot cleaner performs a mopping operation using the mop unit in the state in which the replaceable mop is not provided, FIGS. 23a and 24a show that when the sliding module moves forward, foreign matter is introduced into the collection portion and air flows through the air channel, and FIGS. 23b and 24b show when the sliding module moves rearward, foreign matter is prevented from being discharged from the collection portion; and FIGS. 25a and 25b are sectional views of a maintenance device for suctioning the foreign matter collected in the collection portion of the robot cleaner, wherein FIG. 25a is a partial sectional view of the robot cleaner of FIG. 11, FIG. 25b is a partial sectional view of the robot cleaner of FIG. 19, FIG. 25a shows that the maintenance device is used in the state in which the replaceable mop is fixed to the robot cleaner, and FIG. 25b shows that the maintenance device is used in the state in which the replaceable mop is separated from the robot cleaner.

DETAILED DESCRIPTION

Figure 1:
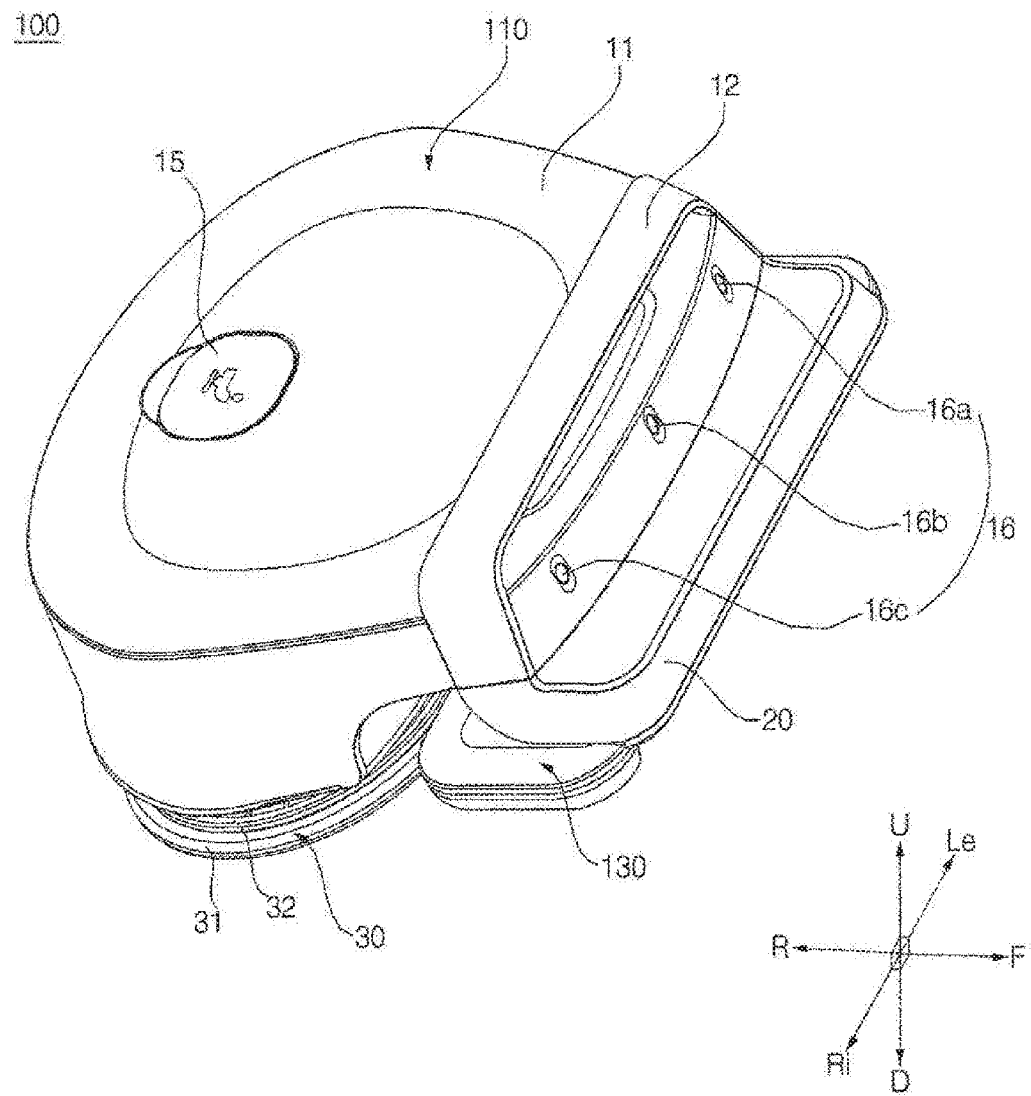
FIG. 1 is a perspective view of a robot cleaner according to a first embodiment of the present invention.
Figure 2:
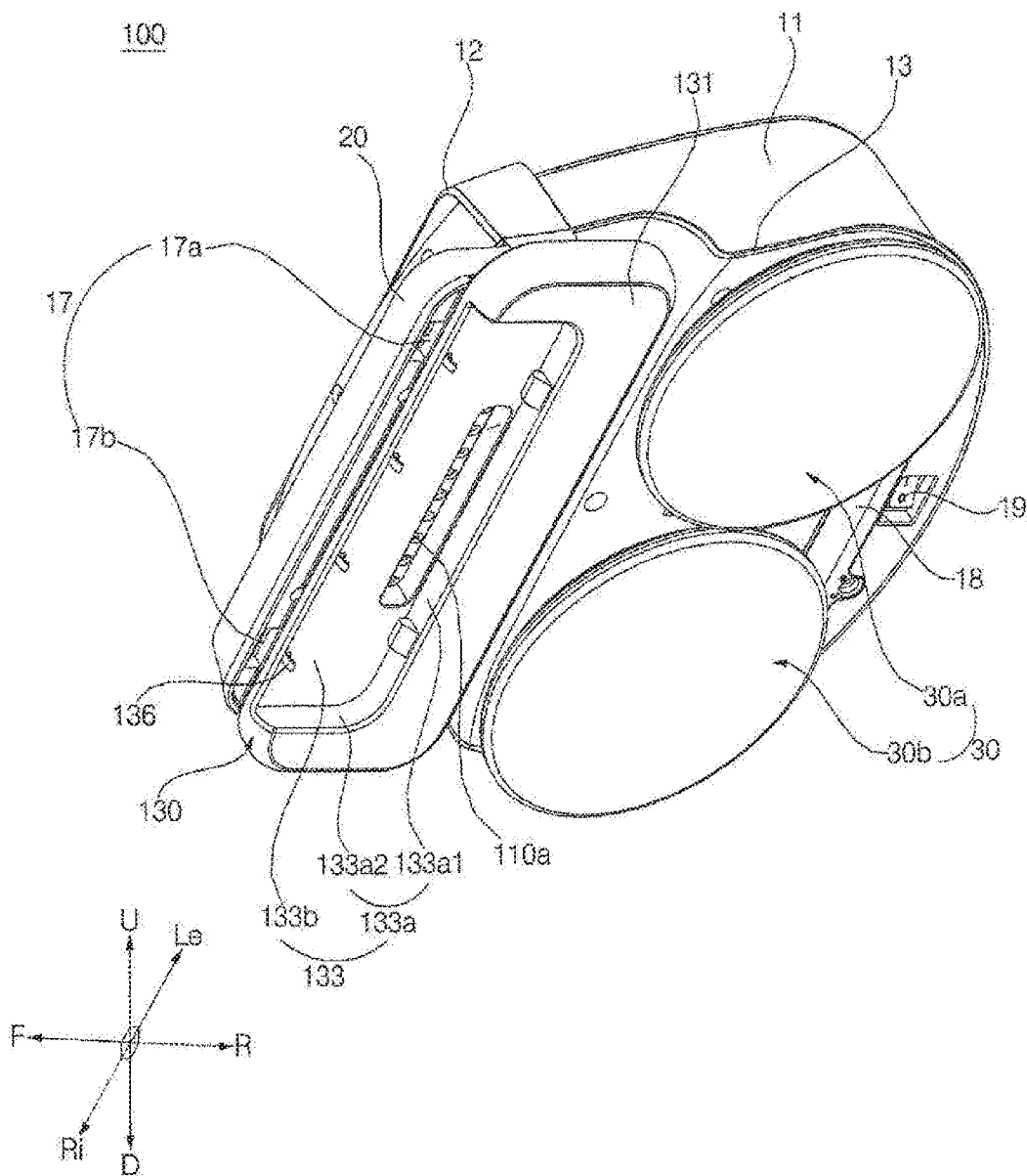
FIG. 2 is a perspective view of the robot cleaner of FIG. 1 when viewed from another angle.
Figure 3:
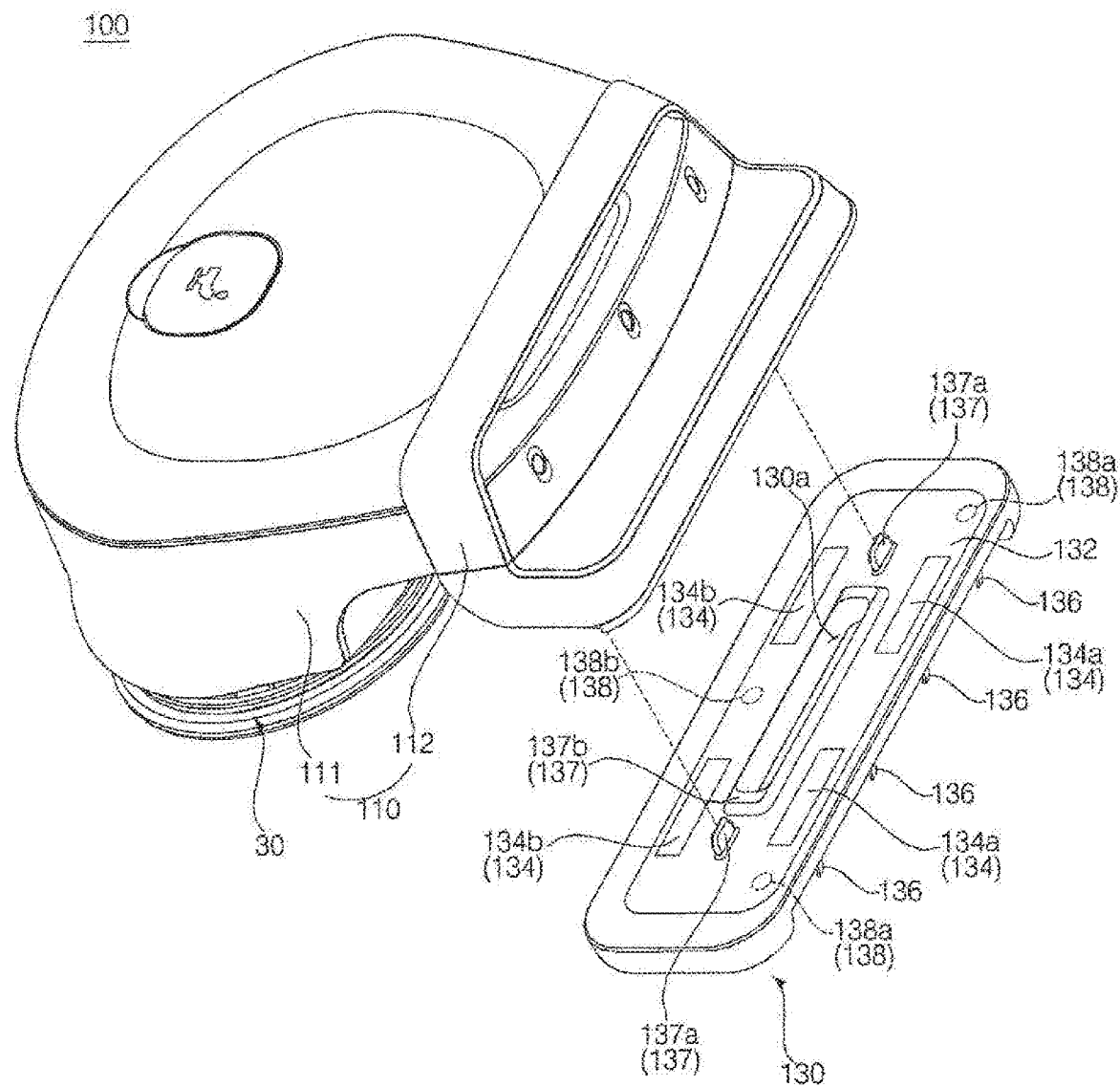
FIG. 3 is an exploded perspective view of a body and a sliding module of FIG. 1.
Figure 4:
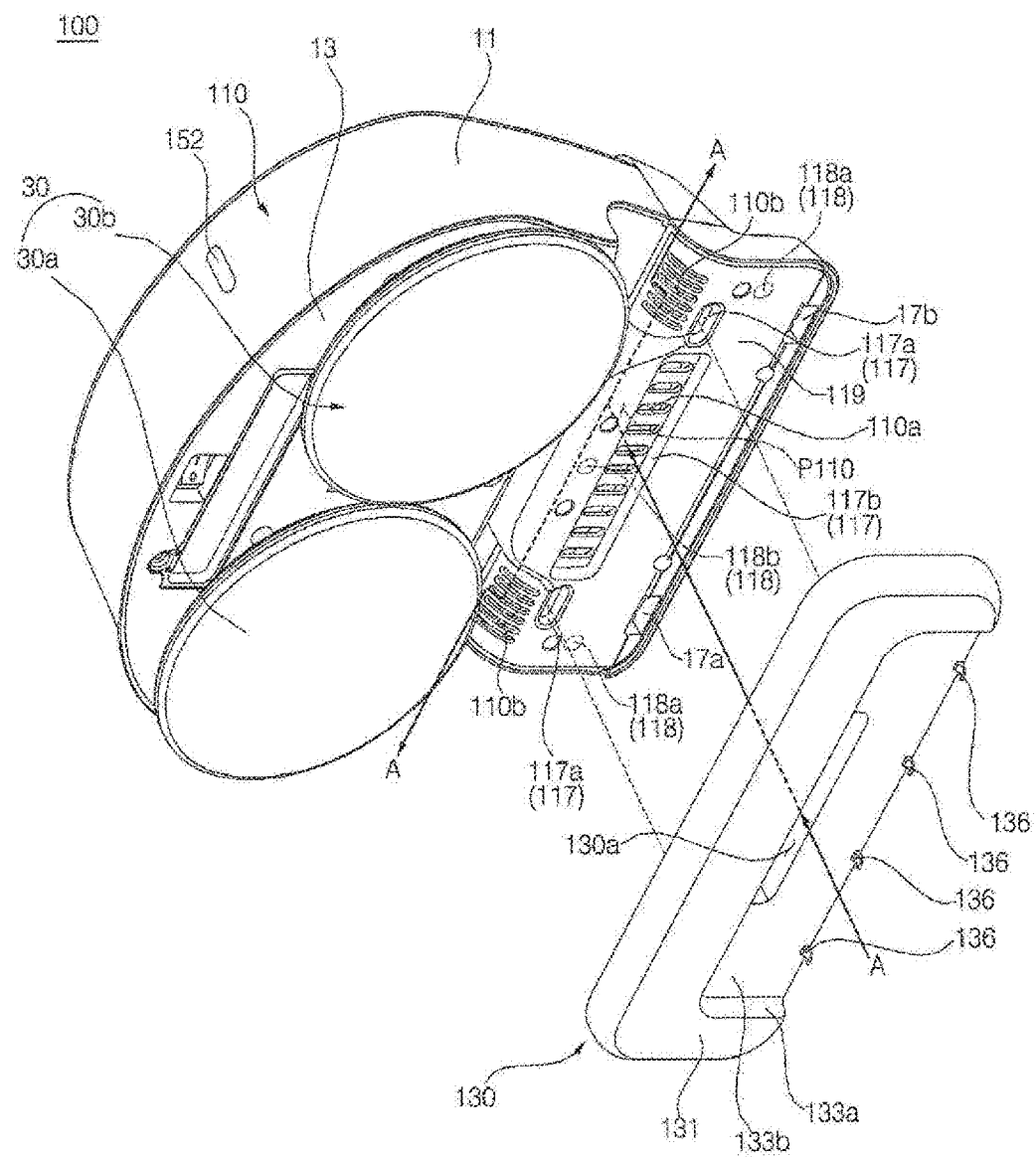
FIG. 4 is an exploded perspective view of the body and the sliding module of FIG. 3 when viewed from another angle.
Figure 5:
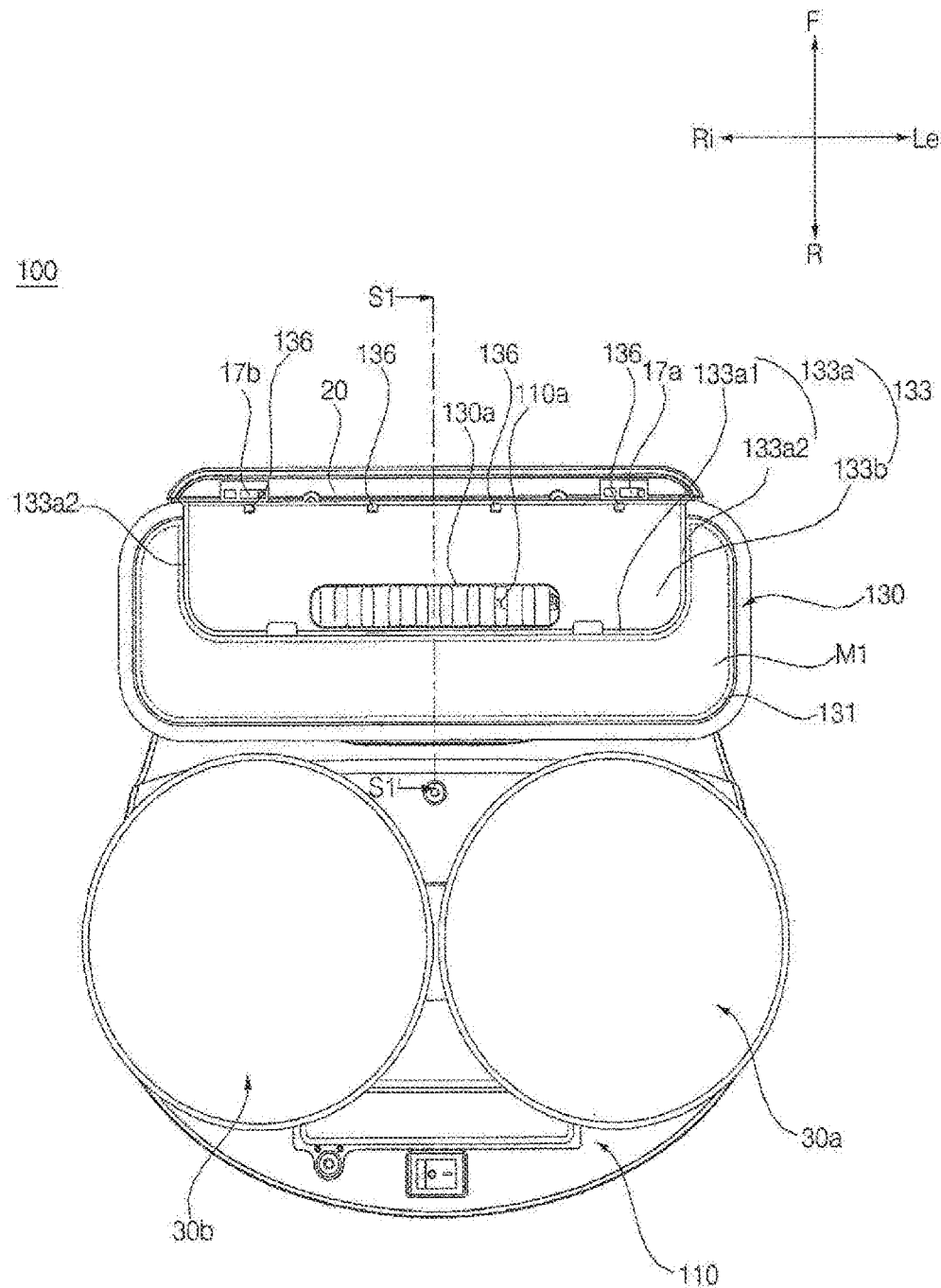
FIG. 5 is a bottom elevation view showing the robot cleaner of FIG. 1.
Figure 6:
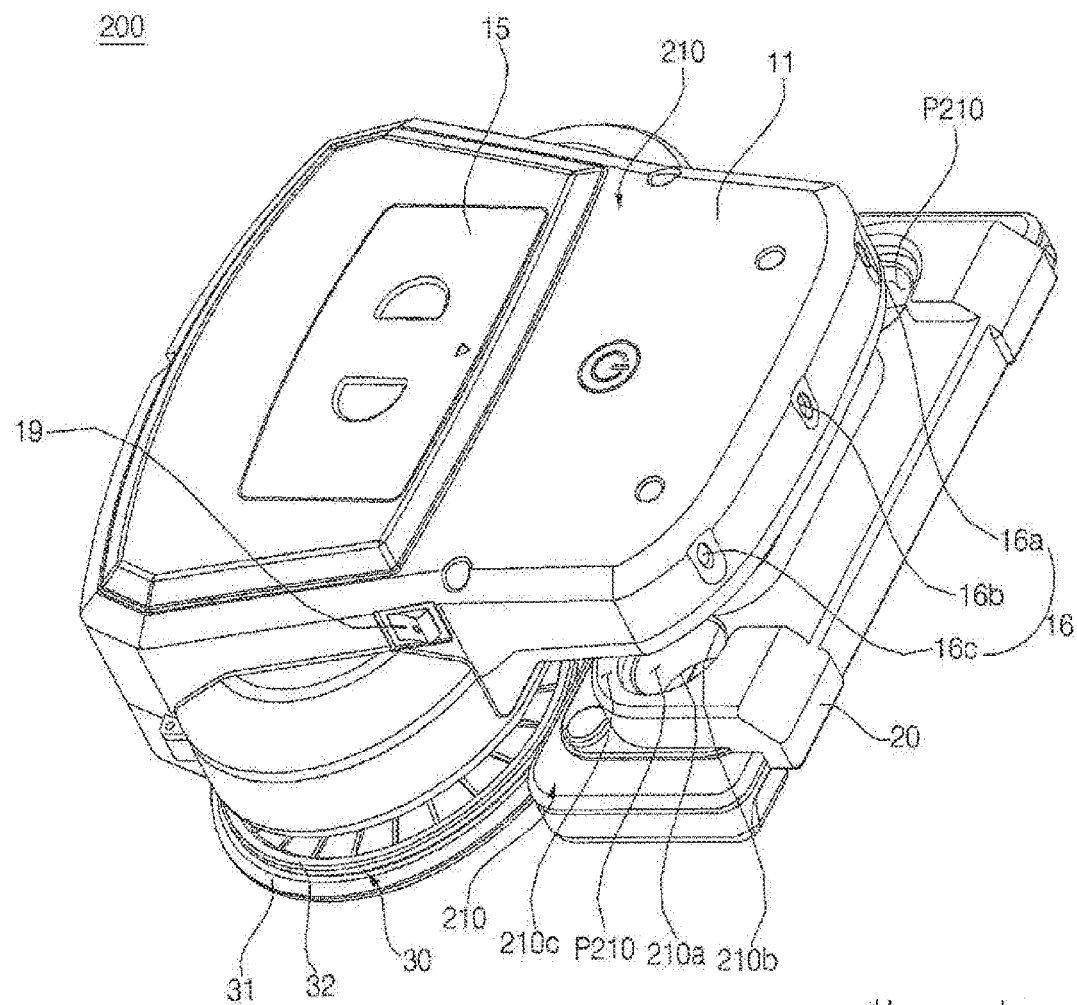
FIG. 6 is a perspective view of a robot cleaner according to a second embodiment of the present invention.
Figure 6:
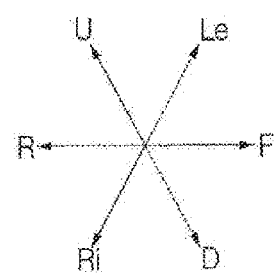
Figure 7:
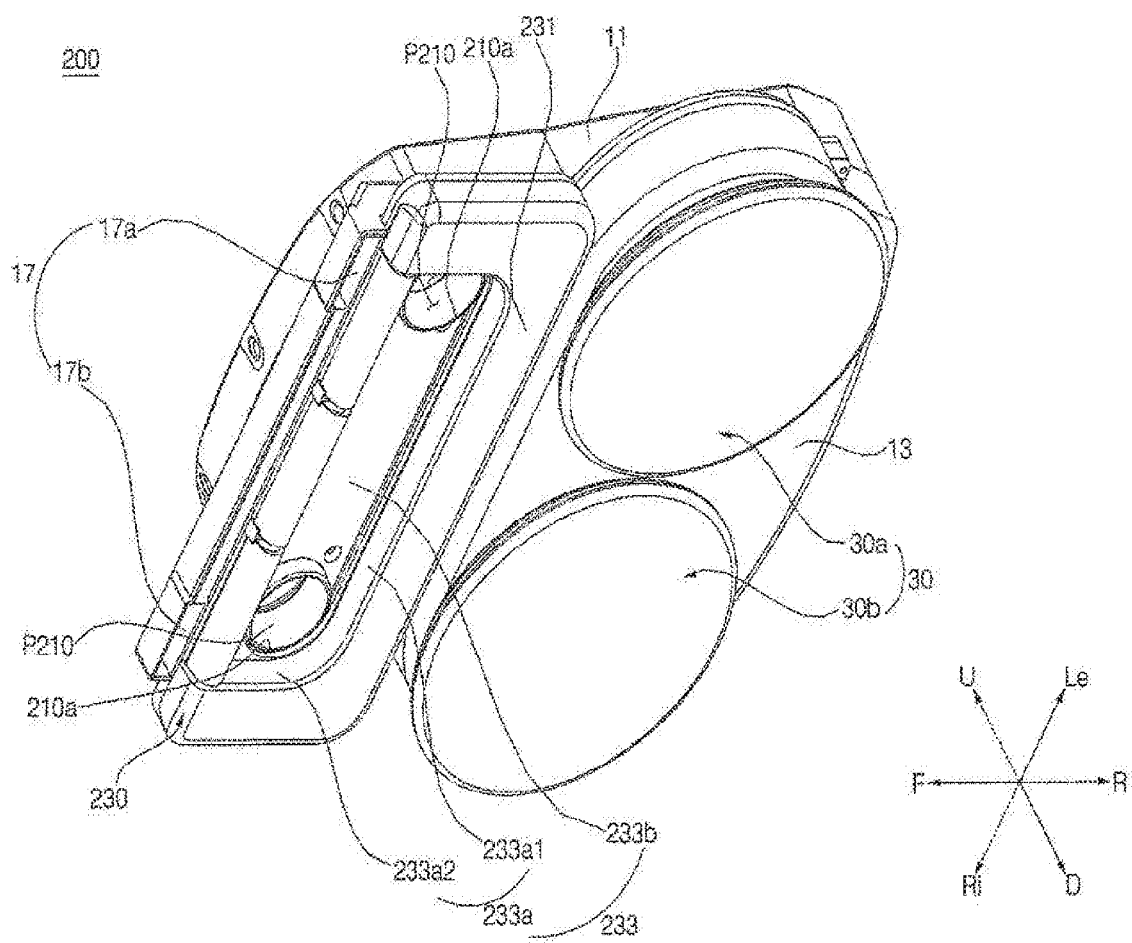
FIG. 7 is a perspective view of the robot cleaner of FIG. 6 when viewed from another angle.
Figure 8:
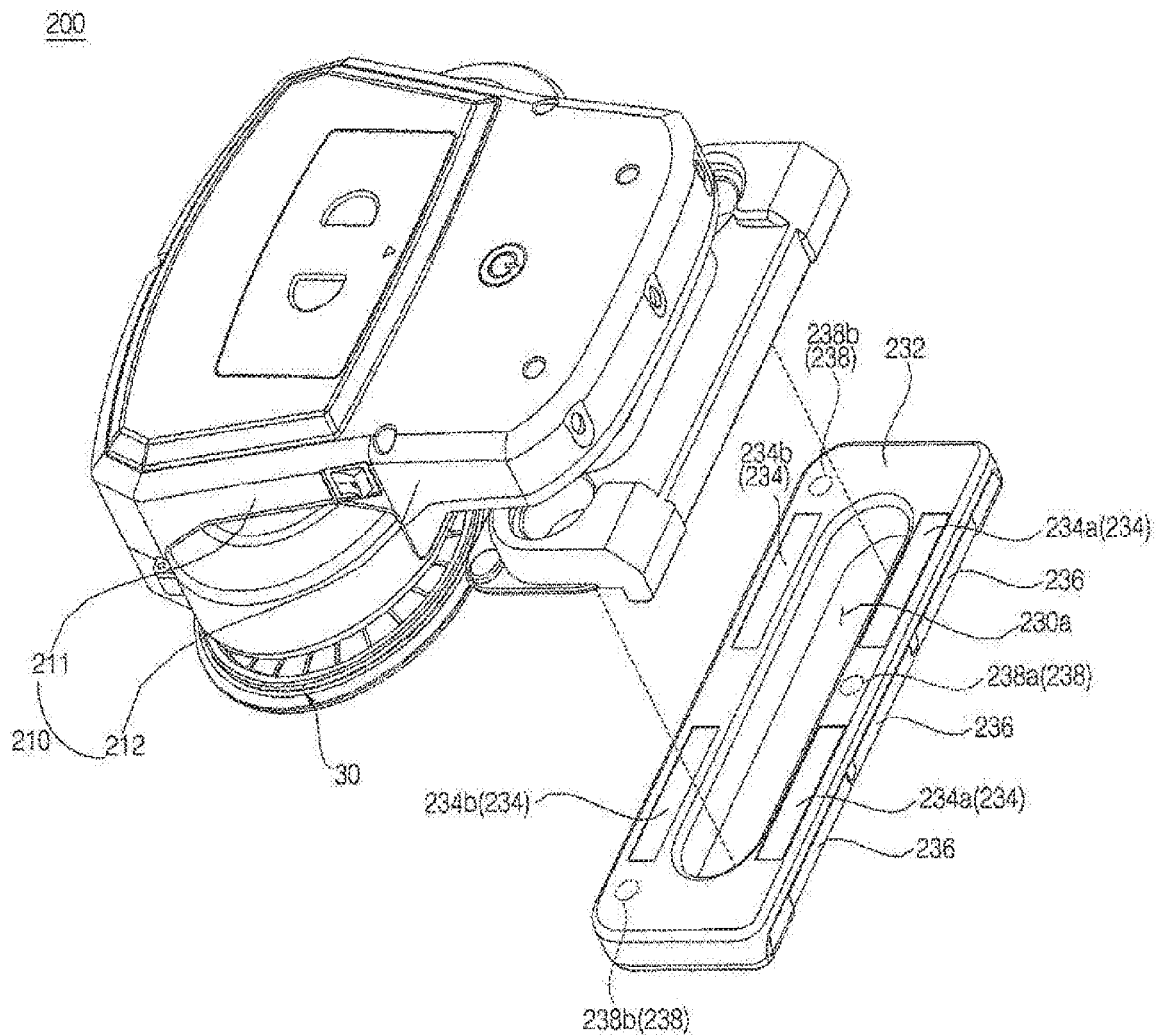
FIG. 8 is an exploded perspective view of a body and a sliding module of FIG. 6.
Figure 9:
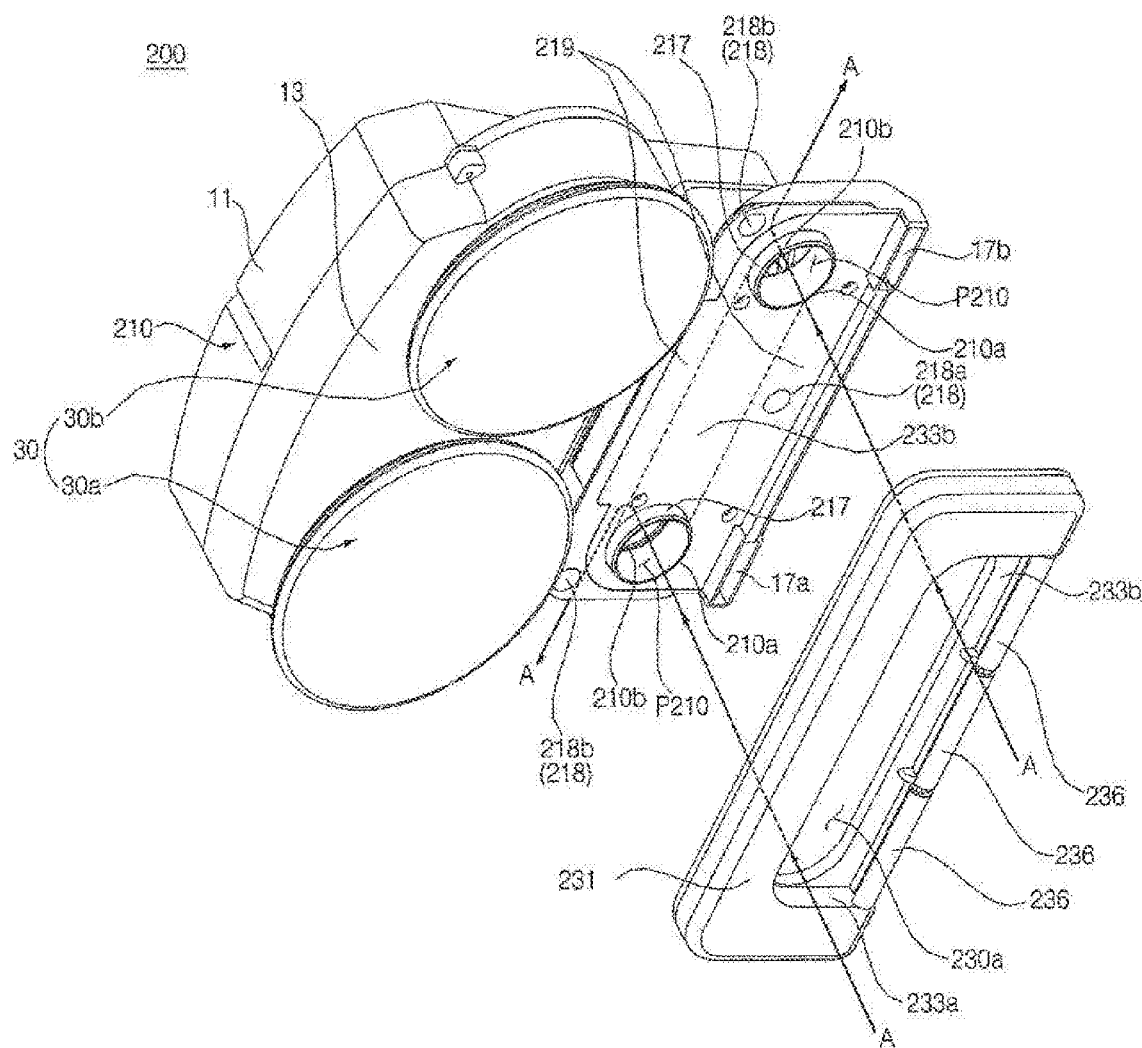
FIG. 9 is an exploded perspective view of the body and the sliding module of FIG. 6 when viewed from another angle.
Figure 10:
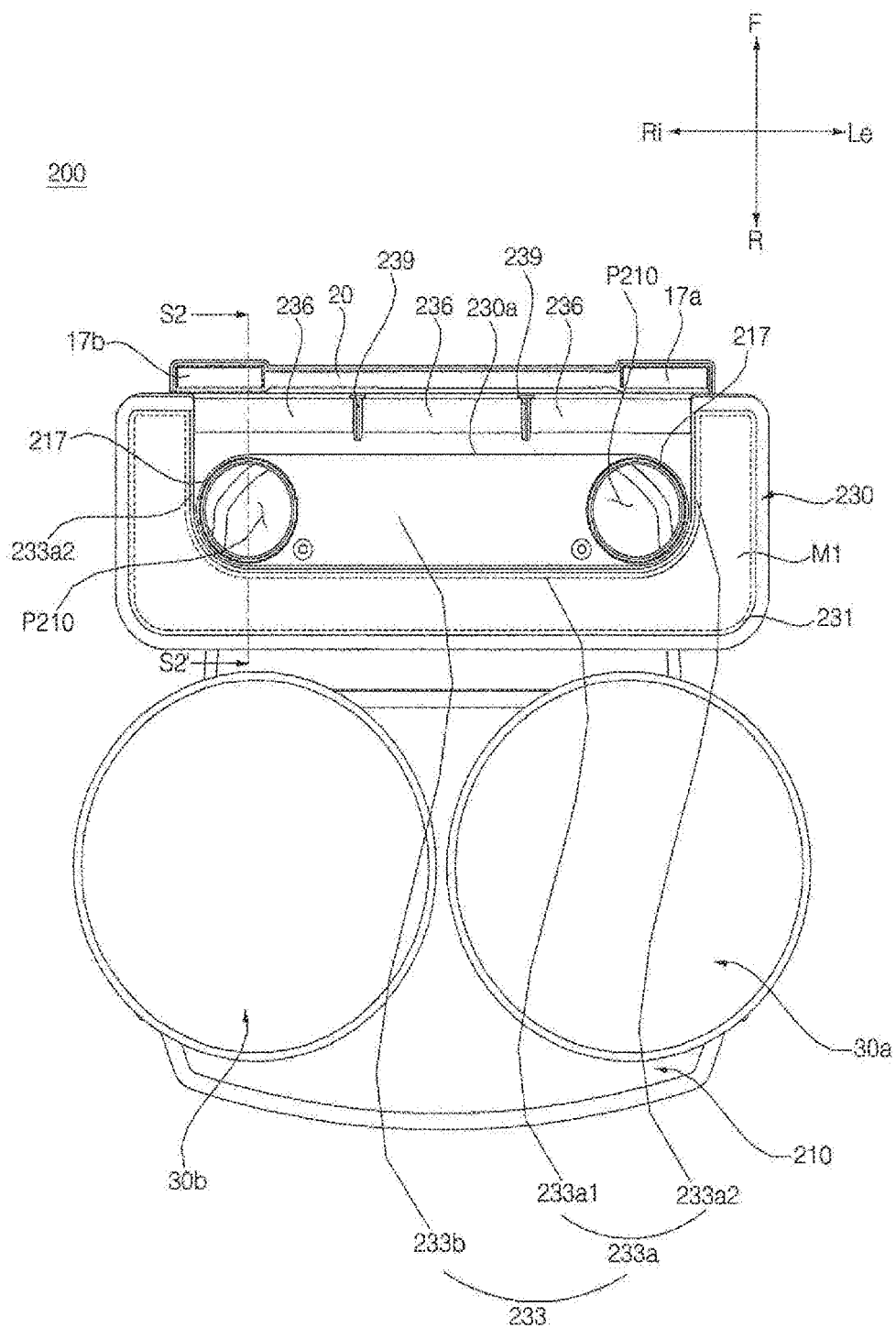
FIG. 10 is a bottom elevation view showing the robot cleaner of FIG. 6.
Figure 11:
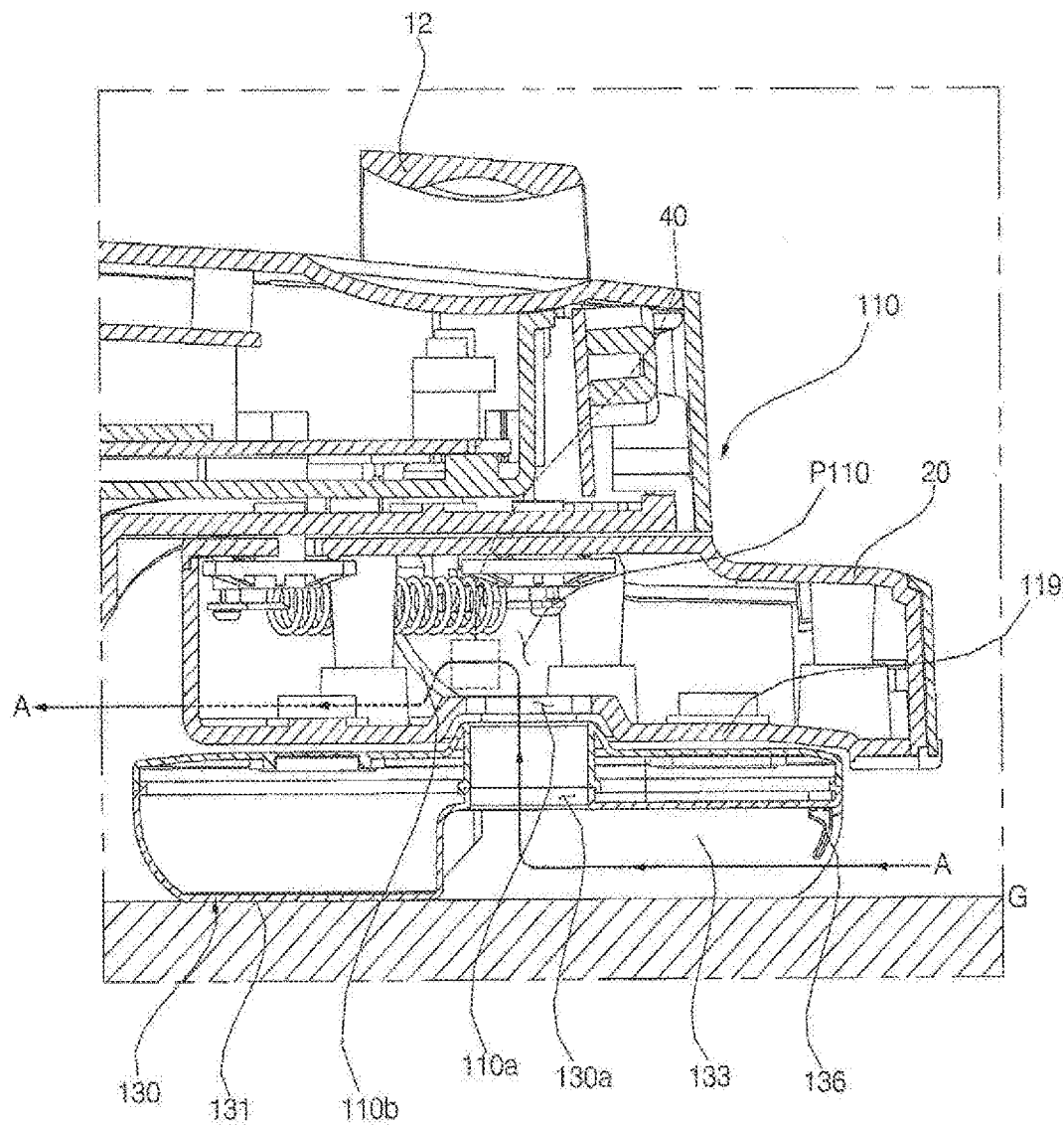
FIG. 11 is a partial sectional view taken along line S1-S1' of FIG. 5.
Figure 12:
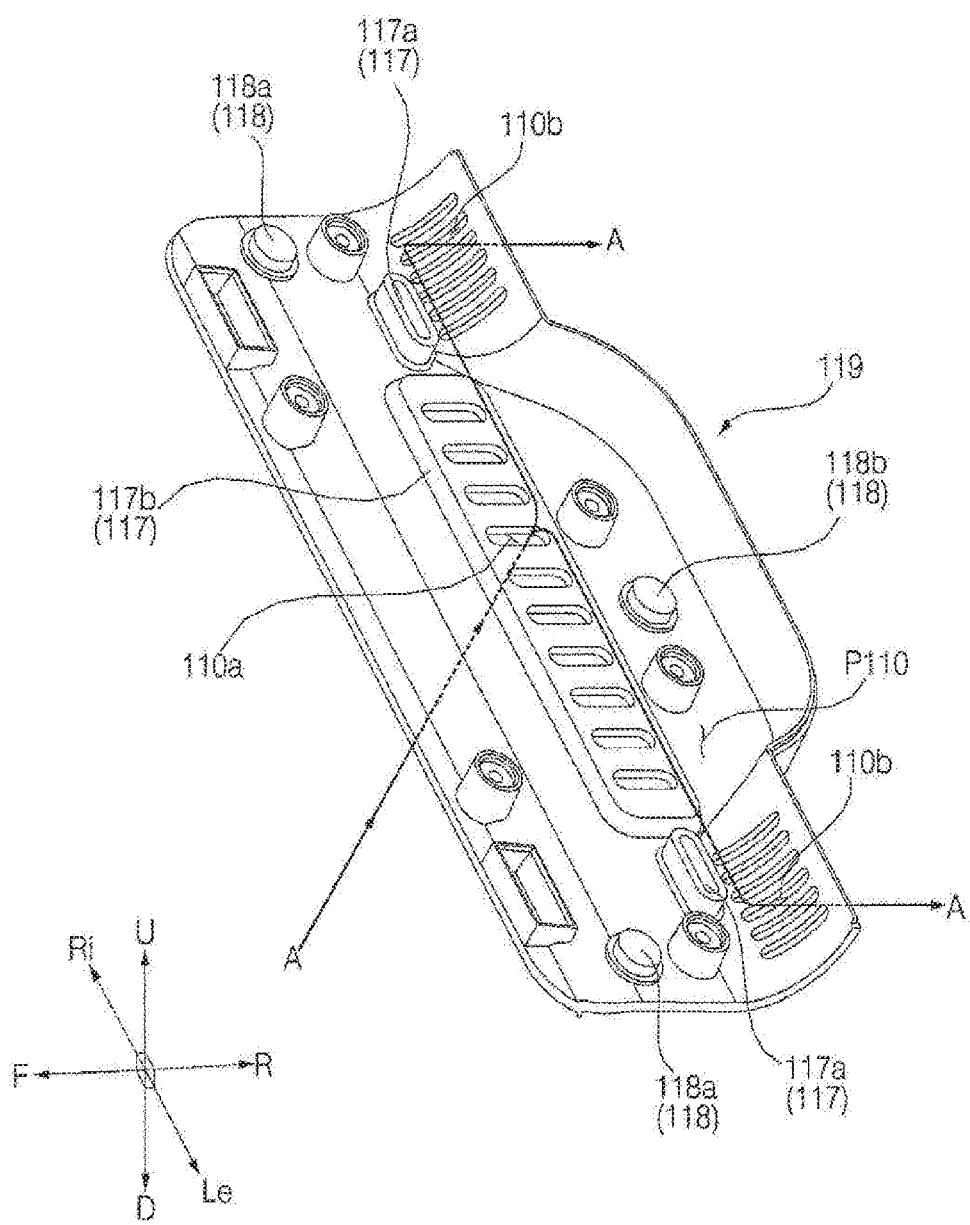
FIG. 12 is a perspective view showing the interior of a module location portion, which is separated from the robot cleaner of FIG. 4.
Figure 13:
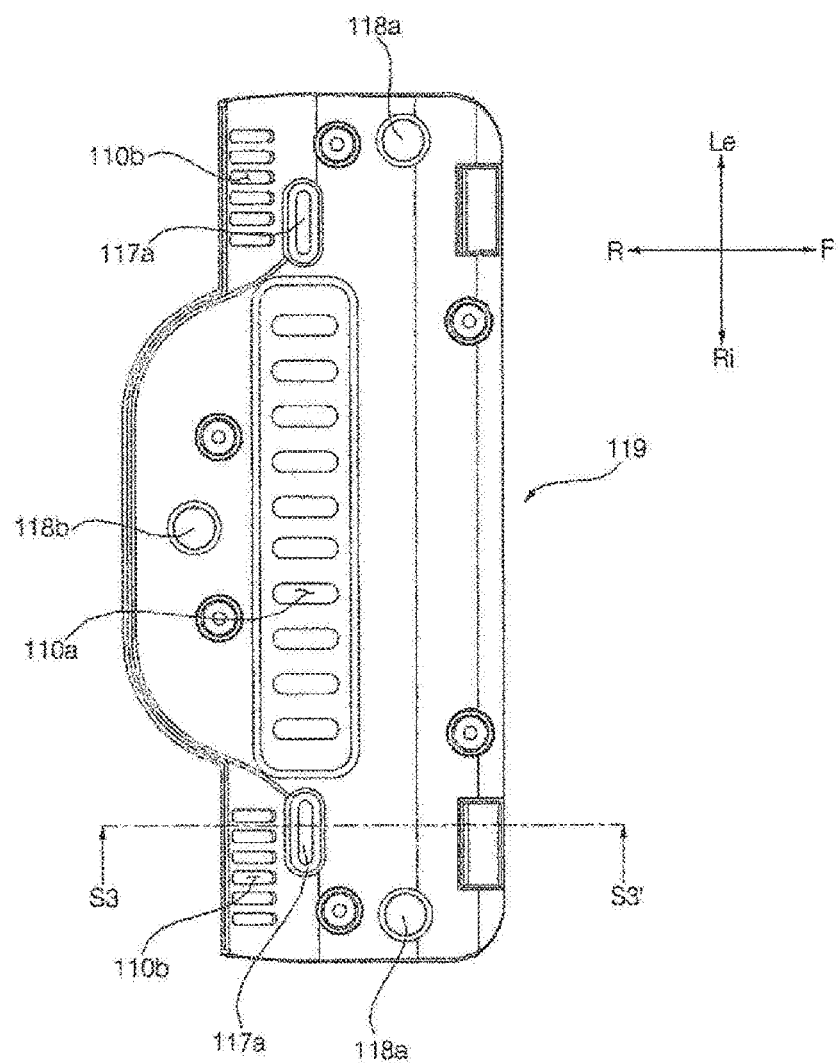
FIG. 13 is a top elevation view showing the interior of the module location portion of FIG. 12.
Figure 14:
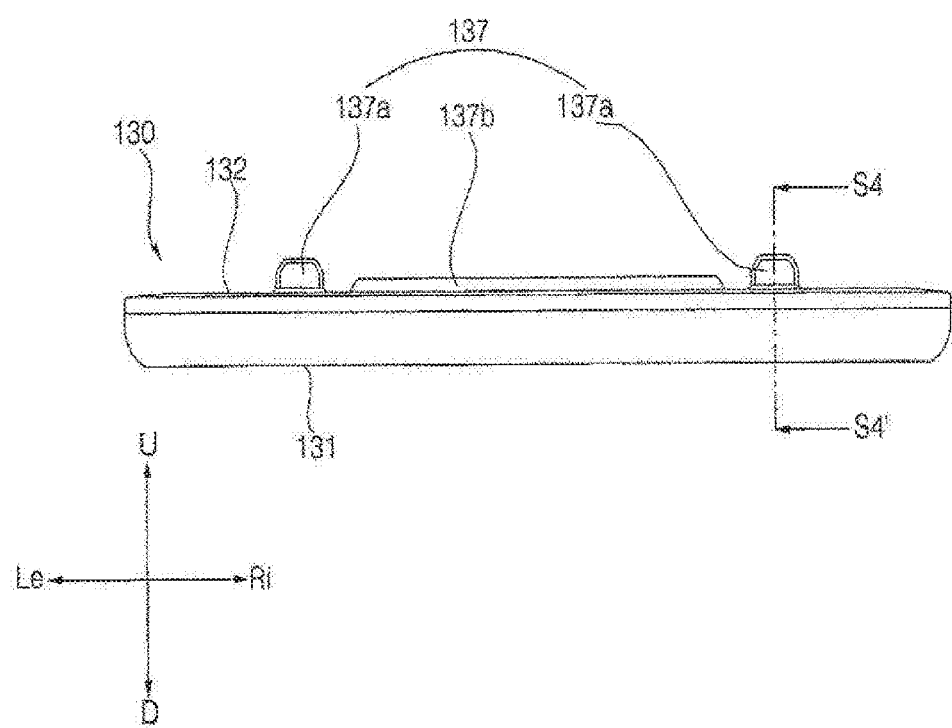
FIG. 14 is a rear elevation view showing the sliding module of FIG. 4.

Exemplary embodiments of the present invention will be described with reference to the attached drawings.

In the following description, the terms "forward (F)," "rearward (R)," "leftward (Le)," "rightward (Ri)," "upward (U)," and "downward (D)," which indicate directions, are defined as shown in FIGS. 1, 2, 5, 6, 7, and 10. However, these definitions are given only for clear understanding of the present invention, and the directions may be differently defined depending on the circumstances.

In the following description, the terms "first," "second," and "third" are used only to avoid confusion between designated components, and do not indicate the sequence or importance of the components or the relationships between the components. For example, a robot cleaner may include only a second component, and may lack a first component.

Meanwhile, a mop M1 or M2, which will be mentioned below, may be made of various materials, such as fabric or paper. In addition, the mop may be washable for repeated use or disposable.

Referring to FIGS. 1 to 10, a robot cleaner 100 or 200 according to an embodiment (a first embodiment or a second embodiment) of the present invention includes a body 110 or 210 having a controller provided therein. The robot cleaner 100 or 200 includes a traveling module 30 for supporting the body 110 or 210. The robot cleaner 100 or 200 includes a sliding module 130 or 230 for supporting the body 110 or 210. The body 110 or 210 is supported by the traveling module 30 and the sliding module 130 or 230.

The traveling module 30 moves the robot cleaner 100 or 200. The traveling module 30 moves the body 110 or 210. The traveling module 30 is disposed at the lower side of the body 110 or 210. The traveling module 30 is disposed at the rear side of the sliding module 130 or 230. The traveling module 30 includes a left traveling unit 30a and a right traveling unit 30b. The RPM and the rotation direction of the left traveling unit 30a and the right traveling unit 30b may be controlled to control the forward movement, the rearward movement, and the turning of the robot cleaner 100 or 200.

In this embodiment, the traveling module 30 includes a pair of spin-mops for performing a mopping operation in the state of being in contact with a floor while rotating instead of wheels. Hereinafter, a description will be given based on the traveling module 30 according to this embodiment. However, the present invention is not limited thereto. The traveling module 30 may include other moving means, such as wheels.

The traveling module 30 includes a left spin-mop 30a and a right spin-mop 30b configured to mop the floor while rotating in the clockwise direction or in the counterclockwise direction when viewed from upper side. In this embodiment, the robot cleaner 100 or 200 is configured such that the body 110 or 210 is movable according to the rotation of the left spin-mop 30a and the right spin-mop 30b without any additional wheels. To this end, the lower surface of the left spin-mop 30a is inclined downward in the leftward direction, and the lower surface of the right spin-mop 30b is inclined downward in the rightward direction. The greatest frictional force generated between the left spin-mop 30a and the floor when the left spin-mop 30a is rotated is applied to the lowest point on the lower surface of the left spin-mop 30a. The greatest frictional force generated between the right spin-mop 30b and the floor when the right spin-mop 30b is rotated is applied to the lowest point on the lower surface of the right spin-mop 30b.

When viewed from lower side, the clockwise rotation direction of the left spin-mop 30a is defined as a first forward direction, and the counterclockwise rotation direction of the left spin-mop 30a is defined as a first reverse direction. When viewed from lower side, the counterclockwise rotation direction of the right spin-mop 30b is defined as a second forward direction, and the clockwise rotation direction of the right spin-mop 30b is defined as a second reverse direction.

In order to move the robot cleaner 100 forward in a straight line, the left spin-mop 30a may be rotated in the first forward direction at a predetermined RPM R1, and the right spin-mop 30b may be rotated in the second forward direction at the predetermined RPM R1. In order to move the robot cleaner 100 rearward in a straight line, the left spin-mop 30a may be rotated in the first reverse direction at a predetermined RPM R2, and the right spin-mop 30b may be rotated in the second reverse direction at the predetermined RPM R2. In order to turn the robot cleaner 100 to the right, the left spin-mop 30a may be rotated in the first forward direction at a predetermined RPM R3, and the right spin-mop 30b may be rotated in the second reverse direction) (i), may be stopped without rotation (ii), or may be rotated in the second forward direction at an RPM R4 that is lower than the RPM R3 (iii). In order to turn the robot cleaner 100 to the left, the right spin-mop 30b may be rotated in the second forward direction at a predetermined RPM R5, and the left spin-mop 30a may be rotated in the first reverse direction (i), may be stopped without rotation (ii), or may be rotated in the first forward direction at an RPM R6, which is lower than the RPM R5 (iii).

The traveling module 30 includes mop units 121 disposed at the lower surface of the left spin-mop 30a and the lower surface of the right spin-mop 30b. The mop units 121 may be fixedly disposed at the left spin-mop 30a and the right spin-mop 30b, or may be detachably disposed at the left spin-mop 30a and the right spin-mop 30b.

The traveling module 30 includes rotary plates 122 for fixing the mop units 121. The traveling module 30 includes a pair of left and right rotary plates 122. Each rotary plate 122 may be a circular plate member. The mop units 121 are fixed to the lower surfaces of the rotary plates 122. A rotary shaft lot shown) is fixed to the center of each rotary plate 122, and the rotary shaft is rotated by a motor (not shown), whereby the rotary plate 122 and the mop unit 121 are rotated. A water supply hole (not shown) may be vertically formed through each rotary plate 122. Water from a water supply module may be supplied to the mop unit 121 through the water supply hole from above the rotary plate 122.

The sliding module 130 or 230 may be configured to mop the floor in the state of being in contact with the floor. The sliding module 130 or 230 is disposed at the lower side of the body 110 or 210. The sliding module 130 or 230 is disposed in front of the traveling module 30. The sliding module 130 or 230 is configured to mop the floor while sliding on the floor when the body 110 or 210 is moved.

The robot cleaner 100 or 200 may include a water supply module (not shown) for supplying water necessary to perform a mopping operation. The water supply module may supply water necessary for the traveling module 30 or the sliding module 130 or 230 to perform a mopping operation. The water supply module may include a water tank (not shown) for storing water to be supplied to the traveling module 30 or the sliding module 130 or 230, a pump (not shown) for generating pressure necessary to move water, and a supply pipe (not shown) for guiding the movement of water.

In this embodiment, the traveling module 30 is configured to perform a wet mopping operation (a mopping operation using water), and the water supply module supplies water to the traveling module 30. The water supply module supplies water to the left spin-mop 30a and the right spin-mop 30b. The left spin-mop 30a and the right spin-mop 30b are configured to perform a wet mopping operation.

Also, in this embodiment, the sliding module 130 or 230 is configured to perform a dry mopping operation (a mopping operation without water). The water supply module does not supply water to the sliding module 130 or 230. Hereinafter, a description will be given based on this embodiment. However, the present invention is not limited thereto. The water supply module may be configured to supply water to the sliding module 130 or 230, rather than the traveling module 30, or may be configured to supply water to both the traveling module 30 and the sliding module 130 or 230.

The robot cleaner 100 or 200 includes a battery (not shown) for supplying power necessary to rotate the traveling module 30. In this embodiment, no power is supplied to the sliding module 130 or 230. However, the present invention is not limited thereto.

The robot cleaner 100 or 200 includes a case 11, which defines the external appearance thereof. The case 11 defines the upper surface, the front surface, the rear surface, the left surface, and the right surface of the body 110 or 210. The robot cleaner 100 or 200 includes a base 13, which defines the lower surface of the body 110 or 210. The traveling module 30 is fixed to the base 13. The sliding module 130 or 230 is fixed to the base 13. The controller, the water supply module, and the battery are disposed in a space defined by the case 11 and the base 13. The robot cleaner 100 or 200 may include a handle 12 for allowing a user to lift the robot cleaner 100 or 200.

The robot cleaner 100 or 200 includes a water tank opening and closing unit 15 for opening and closing the water tank. The water tank opening and closing unit 15 is disposed at the upper surface of the body 110 or 210. The robot cleaner 100 or 200 may include a water level indication unit (not shown) for indicating the water level of the water tank.

The robot cleaner 100 or 200 includes an obstacle sensor 16 for sensing an obstacle in front thereof. A plurality of obstacle sensors 16a, 16b, and 16c may be provided. The obstacle sensor 16 is disposed at the front surface of the body 110 or 210.

The robot cleaner 100 or 200 includes a cliff sensor 17 for sensing if there is a cliff in the floor within a cleaning zone. A plurality of cliff sensors 17a and 17b may be provided. The cliff sensor 17 may sense if there is a cliff in a region ahead of the sliding module 130 or 230. The cliff sensor 17 may sense if there is a cliff in a region ahead of a module location portion 119 or 219. The cliff sensor 17 is disposed in front of the lower part of a bumper 20. A hole Hc for cliff sensing is formed in a lower surface of the front part of the body.

The robot cleaner 100 or 200 includes a battery introduction unit 18 for inserting the battery into the body 110 or 210 or withdrawing the battery from the body 110 or 210. The robot cleaner 100 or 200 includes a power switch 19 for supplying power to the robot cleaner or interrupting the supply of power to the robot cleaner. The robot cleaner 100 or 200 may include an input unit (not shown) for allowing a user to input various commands. The robot cleaner 100 or 200 may include a communication module (not shown) for communication with an external device.

The controller controls the autonomous travel of the robot cleaner 100 or 200. The controller may process a sensing signal from the obstacle sensor 16 or the cliff sensor 17. The controller may process a signal from the input unit or a signal input through the communication module. The controller may include a printed circuit board (PCB) disposed in the body 110 or 210.

The body 110 or 210 includes a first part 111 or 211 disposed at the upper side of the traveling module 30 and a second part 112 or 212 disposed at the upper side of the sliding module 130 or 230. The body 110 or 210 is configured such that the volume of the body 110 or 210 at the upper side of the traveling module 30 is greater than the volume of the body 110 or 210 at the upper side of the sliding module 130 or 230. Specifically, the volume of the first part 111 or 211 is greater than the volume of the second part 112 or 212. The forward-rearward width, the leftward-rightward width, and the upward-downward width of the first part 111 or 211 are greater than the forward-rearward width, the leftward-rightward width, and the upward-downward width of the second part 112 or 212, respectively.

The body 110 or 210 includes a bumper 20 for sensing external impacts. The bumper 20 is disposed in front of the body 110 or 210. The bumper 20 is disposed further forward than the sliding module 130 or 230. The bumper 20 is disposed in front of the module location portion. The bumper 20 is disposed at the upper side of the sliding module 130 or 230.

The sliding module 130 or 230 is provided with a module hole 130a or 230a, which is vertically formed through the sliding module 130 or 230. The module hole 130a or 230a is formed through a body location portion 132 or 232. The robot cleaner 100 or 200 includes an air channel extending through the sliding module 130 or 230 and the body 110 or 210.

Referring to FIGS. 3, 4, 8, and 9, the sliding module 130 or 230 is detachably provided at the body 110 or 210. The sliding module 130 or 230 is provided at the lower side of the body 110 or 210 such that the sliding module 130 or 230 is movable upward and downward so as to be coupled to and detached from the body 110 or 210.

The body 110 or 210 includes a module location portion 119 or 219, in which the sliding module 130 or 230 is located. The module location portion 119 or 219 is disposed in front of the body 110 or 210. The module location portion 119 or 219 has a surface that faces downward.

The sliding module 130 or 230 includes a body location portion 132 or 232 which the body 110 or 210 is located. The body location portion 132 or 232 is detachably coupled to the module location portion 119 or 219. The body location portion 132 or 232 is disposed at the upper side of the sliding module 130 or 230. The body location portion 132 or 232 has a surface that faces upward.

The module location portion 119 or 219 and the body location portion 132 or 232 are disposed at corresponding positions.

Referring to FIGS. 3, 4, 8, 9, 15*a* to 15*c*, and 22, the robot cleaner 100 or 200 includes a mop fixing unit 134 or 234 for fixing a replaceable mop M2 between the module location portion 119 or 219 and the body location portion 132 or 232. In the state in which the sliding module 130 or 230 is coupled to the body 110 or 210, the module location portion 119 or 219 or the body location portion 132 or 232 pushes the mop fixing unit 134. In the state in which the sliding module 130 or 230 is coupled to the body 110 or 210, the replaceable mop M2 fixed to the mop fixing unit 134 or 234 is caught between the module location portion 119 or 219 and the body location portion 132 or 232, whereby the replaceable mop M2 is more strongly fixed to the sliding module 130 or 230.

The sliding module 130 or 230 supports the body 110 or 210. In this case, the replaceable mop M2 is more strongly fixed to the mop fixing unit 134 or 234 when the load of the body 110 or 210 is transmitted to the sliding module 130 or 230. In addition, frictional force is increased when a mopping operation is performed by the sliding module 130 or 230, whereby the mopping operation is more efficiently performed.

The mop fixing unit 134 or 234 is disposed at the body location portion 132 or 232. In the state in which the sliding module 130 or 230 is separated from the body 110 or 210, therefore, a user may pick up the sliding module 130 or 230 and may replace the replaceable mop M2, whereby user convenience is improved. In addition, the replaceable mop M2 is fixed to the sliding module 130 or 230 so as to wrap the sliding module 130 or 230, whereby easy fixing is achieved. In this case, in the state in which the sliding module 130 or 230 is coupled to the body 110 or 210, the module location portion 119 or 219 pushes the mop fixing unit 134 or 234.

The mop fixing unit 134 or 234 includes a friction-forming surface that provides relatively high frictional force in the state in which the mop is in contact with the friction-forming surface. Specifically, in the relationship with the replaceable mop M2, the friction-forming surface may include a material or structure that provides higher frictional force than the periphery of the friction-forming surface. For example, the friction-forming surface may include Velcro. In another example, the friction-forming surface may be made of a material having high frictional force, such as rubber. In a further example, the friction-forming surface may include a surface having a plurality of crimps or protrusions. The wrap fixing unit 134 or 234 may include a hook structure for fixing the replaceable mop M2.

A plurality of mop fixing units 134*a* and 134*b* or 234*a* and 234*b* may be provided. The mop fixing unit 134 or 234 includes a front mop fixing unit 134*a* or 234*a* disposed in front of a guide protrusion 137 or 217 and a guide 117 or 230*a* and a rear mop fixing unit 134*b* or 234*b* disposed at the rear of the guide protrusion 137 or 217 and the guide 117 or 230*a*. A plurality of front mop fixing units 134*a* or 234*a* spaced apart from each other in the leftward-rightward direction may be provided. A plurality of rear mop fixing units 134*b* or 234*b* spaced apart from each other in the leftward-rightward direction may be provided. Consequently, the front mop fixing unit 134*a* or 234*a* may fix one end of the replaceable mop M2 in front of the guide protrusion 137 or 217 and the guide 117 or 230*a*, the rear mop fixing unit 134*b* or 234*b* may fix the other end of the replaceable mop M2 at the rear of the guide protrusion 137 or 217 and the guide 117 or 230*a*, and the replaceable mop M2 may be fixed in the state of wrapping the sliding module 130 or 230.

Referring to FIGS. 3, 4, 8, 9, 12, and 13, the sliding module 130 or 230 includes a coupling unit 138 or 238. The coupling unit 138 or 238 is disposed at the body location portion 132 or 232. The body 110 or 210 includes a corresponding coupling unit 118 or 218 disposed at a position corresponding to the coupling unit 138 or 238. The corresponding coupling unit 118 or 218 is disposed at the module location portion 119 or 219. The coupling unit 138 or 238 and the corresponding coupling unit 118 or 218 are coupled to each other. Coupling force is generated through the coupling between the coupling unit 138 or 238 and the corresponding coupling unit 118 or 218. One of the coupling unit 138 or 238 and the corresponding coupling unit 118 or 218 includes a magnet, and the other of the coupling unit 138 or 238 and the corresponding coupling unit 118 or 218 includes a material that is attracted by the magnet. The material that is attracted by the magnet may be metal. In this embodiment, the coupling unit 138 or 238 and the corresponding coupling unit 118 or 218 include magnets, opposite surfaces of which have different polarities. The magnet or the material that is attracted by the magnet may be exposed from the outer surfaces of the body 110 or 210 and the sliding module 130 or 230, or may be fixedly disposed at the inner surfaces of cabinets, which define the outer surfaces thereof. By the coupling force between the coupling unit 138 or 238 and the corresponding coupling unit 118 or 218, the sliding module 130 or 230 may be coupled to the body 110 or 210, and the replaceable mop M2, disposed so as to be caught between the body 110 or 210 and the sliding module 130 or 230, may be fixed.

A plurality of coupling units 138*a* and 138*b* or 238*a* and 238*b* may be provided. Correspondingly, a plurality of corresponding coupling units 118*a* and 118*b* or 218*a* and 218*b* may be provided. The coupling unit 138 or 238 includes a front coupling unit 138*a* or 238*a* disposed in front of the guide protrusion 137 or 217 and the guide 117 or 230*a* and a rear coupling unit 138*b* or 238*b* disposed at the rear of the guide protrusion 137 or 217 and the guide 117 or 230*a*. In addition, the corresponding coupling unit 118 or 218 includes a corresponding front coupling unit 118*a* or 218*a* disposed in front of the guide protrusion 137 or 217 and the guide 117 or 230*a* and a corresponding rear coupling unit 118*b* or 218*b* disposed at the rear of the guide protrusion 137 or 217 and the guide 117 or 230*a*. A plurality of front coupling units 138*a* or 238*a* and corresponding front coupling units 118*a* or 218*a* spaced apart from each other in the leftward-rightward direction may be provided. A plurality of rear coupling units 138*b* or 238*b* and corresponding rear coupling units 118*b* or 218*b* spaced apart from each other in the leftward-rightward direction may be provided. The front coupling unit 138*a* or 238*a* may be disposed on the same axis in a leftward-rightward direction as the front mop fixing unit 134*a* or 234*a*, or may be disposed further forward than the front mop fixing unit 134*a* or 234*a*. The corresponding front coupling unit 118*a* or 218*a* is disposed at a position corresponding to the front coupling unit 138*a* or 238*a*. The rear coupling unit 138*b* or 238*b* may be disposed on the same axis in a leftward-rightward direction as the rear mop fixing unit 134*b* or 234*b*, or may be disposed further rearward than the rear mop fixing unit 134*b* or 234*b*. The corresponding rear coupling unit 118b or 218b is disposed at a position corresponding to the rear coupling unit 138b or 238b. Consequently, the front coupling unit 138a or 238a and the corresponding front coupling unit 118a or 218a may fix one end of the replaceable mop M2 in front of the guide protrusion 137 or 217 and the guide 117 or 230a, the rear coupling unit 138b or 238b and the corresponding rear coupling unit 118b or 218b may fix the other end of the replaceable mop M2 at the rear of the guide protrusion 137 or 217 and the guide 117 or 230a, and the replaceable mop M2 may be strongly fixed in the state of wrapping the sliding module 130 or 230.

Referring to FIGS. 3, 4, 8, 9, 15a to 16b, and 22 to 24b, the guide protrusion 137 or 217 is formed on any one of the module location portion 119 or 219 and the body location portion 132 or 232, and the guide 117 or 230a, into which the guide protrusion 137 or 217 is inserted, is formed in the other of the module location portion 119 or 219 and the body location portion 132 or 232. The guide protrusion 137 or 217 and the guide 117 or 230a guide the separation and coupling between the body 110 or 210 and the sliding module 130 or 230. The guide protrusion 137 or 217 includes a vertically protruding portion. The guide 117 or 230a includes a recess or a hole, in which the vertically protruding portion of the guide protrusion 137 or 217 is caught. Consequently, the vertical coupling and separation between the body 110 or 210 and the sliding module 130 or 230 is easily achieved, and the state in which the body 110 or 210 and the sliding module 130 or 230 are coupled to each other is maintained while the sliding module 130 or 230 horizontally moves along the floor.

In the first embodiment (FIGS. 3, 4, and 15a to 16b), the guide 117 is formed in the module location portion 119, and the guide protrusion 137 is formed on the body location portion 132. The guide 117 may include a first guide 117a, which is not related to the formation of an air channel extending through the body 110 and the sliding module 130. The guide 117 may include a second guide 117b, which defines a portion of the air channel extending through the body 110 and the sliding module 130. A hole 110a, through which air flowing along the air channel passes, is formed in the second guide 117b. A first channel end 110a is disposed at the upper surface of the second guide 117b. The guide protrusion 137 may include a first guide protrusion 137a, which is not related to the formation of the air channel. The guide protrusion 137 may include a second guide protrusion 137b, which defines a portion of the air channel extending through the body 110 and the sliding module 130. The module hole 130a is vertically formed through the second guide protrusion 137b. The second guide protrusion 137b protrudes upward along the circumference of the module hole 130a. The first guide protrusion 137a is coupled to the first guide 117a by the engagement therebetween. The second guide protrusion 137b is coupled to the second guide 117b by the engagement therebetween.

In the second embodiment (FIGS. 8, 9, and 22 to 24b), the guide protrusion 217 is formed in the module location portion 219, and the guide 230a is formed on the body location portion 232. The guide protrusion 217 may define a portion of an air channel extending through the body 210 and the sliding module 230. The guide protrusion 217 may form an air channel P210. A hole 210a, through which air flowing along the air channel passes, is formed in the guide protrusion 217. A first channel end 210a is disposed at the lower end of the guide protrusion 217. The guide 230a may define a portion of the air channel extending through the body 210 and the sliding module 230. The guide 230a may be the module hole 230a. The module hole 230a may not only define the air channel extending through the body 210 and the sliding module 230 but may also serve as the guide 230a, into which the guide protrusion 217 is inserted for coupling between the body 210 and the sliding module 230. The guide protrusion 217 is coupled to the guide 230a by the engagement therebetween. In the second embodiment, although not shown, the robot cleaner 200 may include a guide protrusion and a guide that are not related to the formation of the air channel.

In the first and second embodiments, the air channel extending through the body 110 or 210 and the sliding module 130 or 230 may be formed through the guide protrusion 137b or 217 and the guide 117b or 230a. The air channel will be described in detail below.

Referring to FIGS. 2, 4, 5, 7, 9, 10, and 18, the sliding module 130 or 230 includes a bottom portion 131 or 231 configured to slide along the floor when the body 110 or 210 is moved. The bottom portion 131 or 231 is disposed in front of the traveling module 30. That the bottom portion 131 or 231 is configured to slide along the floor includes both the meaning that the bottom portion 131 or 231 slides along the floor in the state of being in direct contact with the floor and the meaning that the bottom portion 131 or 231 slides along the floor in the state in which the mop unit M1 or the replaceable mop M2 is disposed between the bottom portion 131 or 231 and the floor.

The sliding module 130 or 230 includes a collection portion 133 or 233 recessed in the front of the lower side thereof so as to define a space spaced apart from the floor (a collection space). When viewed from lower side, the bottom portion 131 or 231 wraps the rear and the left and right sides of the collection space. When the robot cleaner 100 or 200 moves forward, therefore, bulky foreign matter is collected in the collection space, and the bottom portion 131 or 231 serves not only to mop the floor but also to prevent the foreign matter from being discharged from the collection space.

Figure 23A:
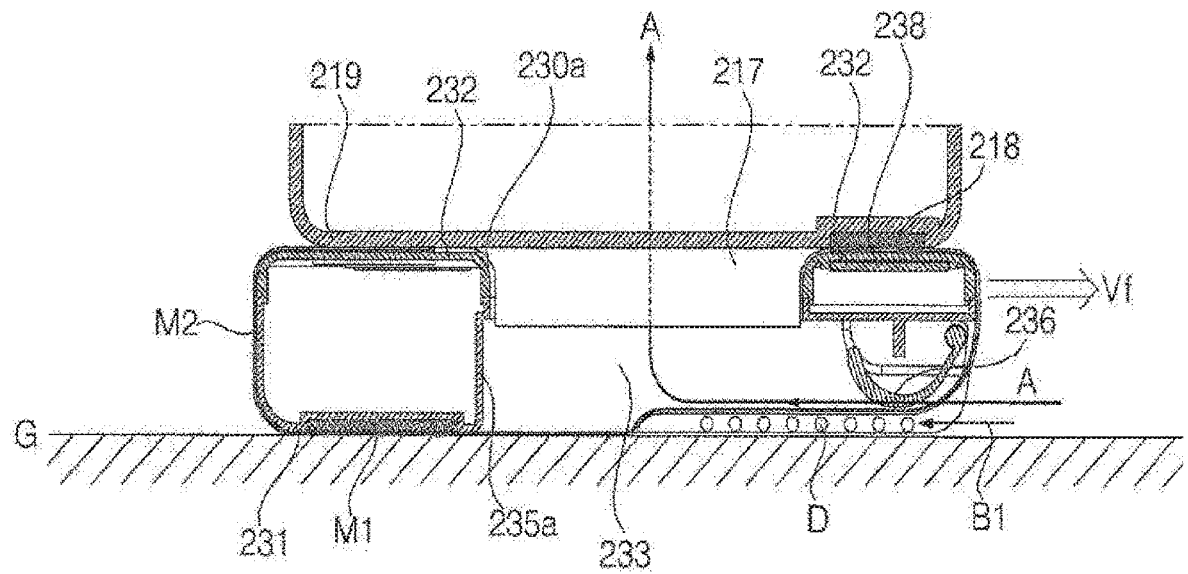
Figure 24A:
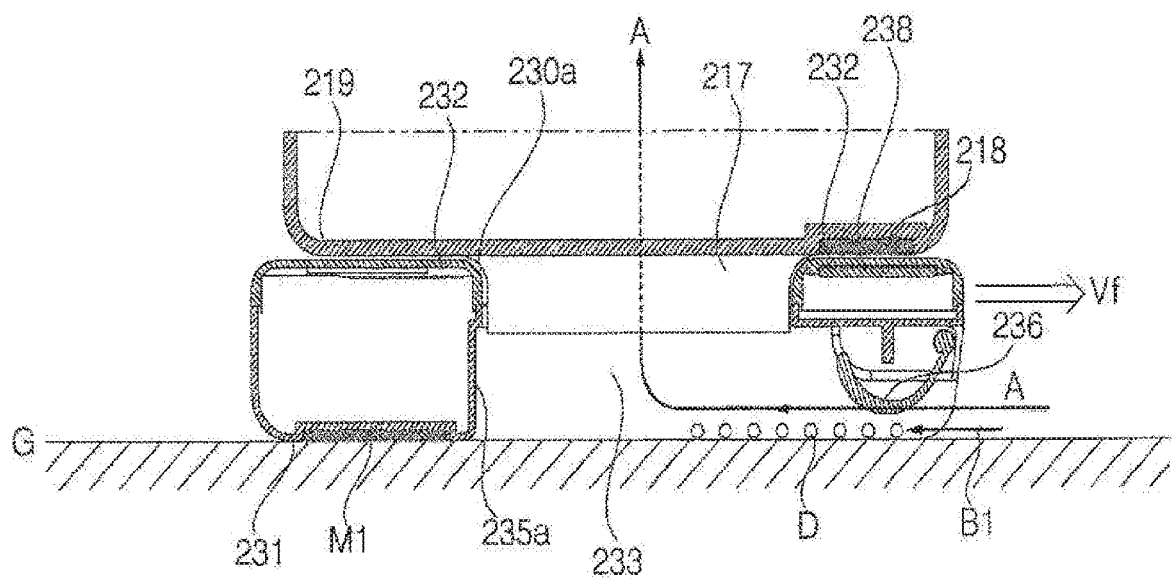

The bottom portion 131 or 231 includes a mop unit M1 configured to mop the floor in the state of being in contact with the floor. The mop unit M1 is fixed to the lower surface of the sliding module 130 or 230. The mop unit M1 may be formed in a shape corresponding to the bottom portion 131 or 231. The left and right parts of the mop unit M1 may protrude forward. The bottom portion 131 or 231 may be provided therein with a recess, in which the mop unit M1 is disposed. The mop unit M1 may be inserted into and fixed in the recess in the bottom portion 131 or 231. The mop unit M1 may be replaceable. In the state in which the replaceable mop M2 is fixed to the mop fixing unit 134 or 234, the replaceable mop M2 may be disposed so as to wrap the bottom portion 131 or 231 of the sliding module 130 or 230. Referring to FIG. 24a, the mop unit M1 may mop the floor while sliding on the floor when the robot cleaner 100 or 200 moves forward. In addition, referring to FIGS. 16a and 23a, the replaceable mop M2 may mop the floor while sliding on the floor when the robot cleaner 100 or 200 moves forward.

Figure 16A:
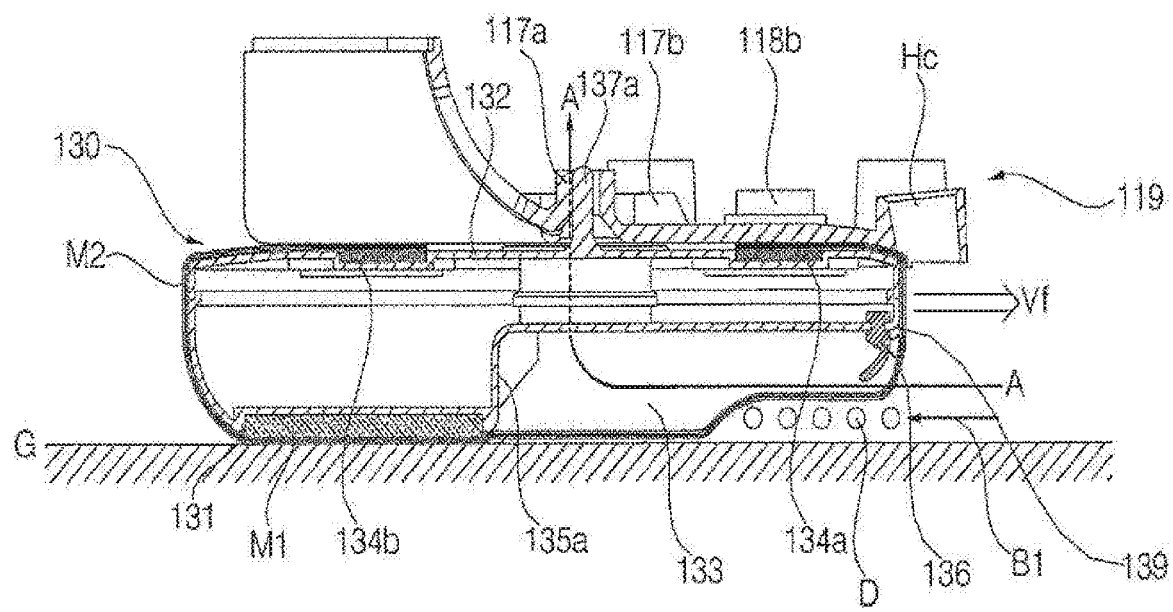

The collection portion 133 or 233 is provided in the front side thereof with an opening. The collection portion 133 or 233 is provided in the lower side thereof with an opening. The front opening and the lower opening in the collection portion 133 or 233 are connected to each other. The front side and the lower side of the collection space are open. The rear side of the collection space is closed. The left and right sides of the collection space are closed. Referring to FIGS. 16a, 23a, and 24a, foreign matter D is introduced into the collection space through the front opening and the lower opening in the collection portion 133 or 233 when the robot cleaner 100 or 200 moves forward (Vf).

The collection portion 133 or 233 includes a blocking portion 133a or 233a, which forms surfaces for partitioning the collection space. The blocking portion 133a or 233a includes a rear blocking portion 133a1 or 233a1, which forms the rear surface of the collection portion 133 or 233. The blocking portion 133a or 233a includes a side blocking portion 133a2 or 233a2, which forms the left and right surfaces of the collection portion 133 or 233. When the robot cleaner 100 or 200 moves forward, turns to the left, or turns to the right, therefore, it is possible to prevent the foreign matter from being discharged from the collection space. The collection portion 133 or 233 defines the upper surface 133b or 233b of the collection space. One end of the air channel may be disposed at the upper surface 133b or 233b of the collection portion.

The mop fixing unit 134 or 234 fixes the replaceable mop M2 for wrapping the front side and the lower side of the collection portion 133 or 233, in which the openings are formed. Referring to FIGS. 16a and 23a, when the robot cleaner 100 or 200 moves forward (Vf) in the state in which the replaceable mop M2 wraps the lower side of the sliding module 130 or 230, a portion of the replaceable mop M2 disposed at the lower side and the front side of the collection space is recessed to form a space for receiving foreign matter D introduced rearward (132), and another portion of the replaceable mop M2 disposed between the bottom portion 131 or 231 and the floor G comes into relatively tight contact with the floor G to prevent the foreign matter D from being discharged from the collection space.

Referring to FIGS. 2, 4, 7, 9, 16a to 17, and 23a to 24b, the sliding module 130 or 230 includes an auxiliary collection member 136 or 236 for making the discharge of foreign matter from the collection portion 133 or 233 more difficult than the introduction of foreign matter into the collection portion 133 or 233. The auxiliary collection member 136 or 236 is disposed in front of the collection portion 133 or 233. The auxiliary collection member 136 or 236 protrudes from the upper side to the lower side thereof. The auxiliary collection member 136 or 236 is disposed in the front opening formed in the collection space. The sliding module 130 or 230 includes an auxiliary collection member fixing unit 139 or 239 for fixing the auxiliary collection member 136 or 236. The auxiliary collection member 136 or 236 serves as a check valve. Referring to FIGS. 16a, 16b, 23a, 23b, 24a, and 24b, foreign matter D is easily introduced into the collection space (B1) when the robot cleaner 100 or 200 moves forward (Vf), and the auxiliary collection member 136 or 236 prevents the foreign matter D from being discharged from the collection space (B2) when the robot cleaner 100 or 200 moves rearward (Vr).

The auxiliary collection member 136 or 236 is curved rearward. The upper part of the auxiliary collection member 136 or 236 is supported by the sliding module 130 or 230. The auxiliary collection member 136 or 236 is curved rearward while protruding from the upper side to the lower side thereof. Consequently, the rearward introduction of the foreign matter D may be easy, whereas the forward discharge of the foreign matter D may be difficult.

In the first embodiment (FIGS. 2, 4, and 16a to 17), the auxiliary collection member 136 is flexible. The upper part of the auxiliary collection member 136 is fixed to the upper surface 133b of the collection portion. The auxiliary collection member 136 includes a protrusion 136a protruding from the upper side to the lower side thereof. The protrusion 136a is curved rearward. The front surface of the protrusion 136a defines a curvature formation surface 136a1, which is gradually curved rearward toward the lower side thereof. The auxiliary collection member 136 includes a support unit 136b for supporting the protrusion 136a at the upper side of the protrusion 136a. The auxiliary collection member fixing unit 139 includes a hole formed in the upper surface 133b of the collection portion. The auxiliary collection member 136 includes a through part 136c extending through the hole in the auxiliary collection member fixing unit 139. The auxiliary collection member 136 includes a hook unit 136d disposed at the upper side of the through part 136c for fixing the auxiliary collection member 136 so as to prevent the auxiliary collection member 136 from being separated from the sliding module 130. The hook unit 136d is caught by the inside of the upper surface 133b of the collection portion.

In the first embodiment, when viewed from the front, the leftward-rightward width of a portion of the front opening that is covered by the auxiliary collection member 136 is configured to be smaller than the leftward-rightward width of a remaining portion of the front opening that is not covered by the auxiliary collection member 136. A plurality of auxiliary collection members 136 spaced apart from each other in the leftward-rightward direction may be provided. In this case, the leftward-rightward width of the portion of the front opening that is covered by the auxiliary collection member 136 is the sum of the leftward-rightward widths of the auxiliary collection members 136. In the state in which the replaceable mop M2 is fixed while wrapping the collection portion 133, therefore, the auxiliary collection member 136 may serve as a frame of the front surface of the replaceable mop M2, and relatively bulky foreign matter may be easily introduced into the collection space through the portion of the front surface of the replaceable mop M2 that is not supported by the auxiliary collection member 136.

In the second embodiment (FIGS. 7, 9, and 23a to 24b), the auxiliary collection member 236 includes a rotary portion 236b configured to be rotatable about a rotating axis disposed at the upper side thereof in the forward-rearward direction. The rotary portion of the auxiliary collection member 236 extends in the leftward-rightward direction. The rotary portion 236b is curved rearward. The distance between the floor and the lower end of the auxiliary collection member 236 in the state in which the rotary portion 236b is maximally rotated rearward is greater than the distance between the floor and the lower end of the auxiliary collection member 236 in the state in which the rotary portion 236b is maximally rotated forward.

The rotation axis means a virtual axis for describing the center of rotation, and does not refer to an actual component. The rotating axis protrudes from any one of the auxiliary collection member 236 and the auxiliary collection member fixing unit 239, and a hole or recess, into which the rotating axis is inserted, is formed in the other of the auxiliary collection member 236 and the auxiliary collection member fixing unit 239. In this embodiment, the auxiliary collection member 236 includes a rotating axis 236a protruding in the leftward-rightward direction, and the auxiliary collection member fixing unit 239 includes a rotating axis support unit 239b having therein a hole or recess, into which the rotating axis 236a is inserted.

A plurality of auxiliary collection members 236 may be arranged in the leftward-rightward direction. The auxiliary collection member fixing unit 239 includes a partition unit 239a disposed between the auxiliary collection members 236. The partition unit 239a supports the auxiliary collection members 236 adjacent thereto. The partition unit 239a includes the rotating axis support unit 239b. The auxiliary collection member fixing unit 239 includes a front limiter 239c for limiting the forward rotational angle of the auxiliary collection member 236. The auxiliary collection member fixing unit 239 includes a rear limiter 239d for limiting the rearward rotational angle of the auxiliary collection member 236. The front limiter 239c and the rear limiter 239d are preset such that the distance between the floor G and the lower end of the auxiliary collection member 236 in the state in which the rotary portion 236b is maximally rotated rearward is greater than the distance between the floor G and the lower end of the auxiliary collection member 236 in the state in which the rotary portion 236b is maximally rotated forward.

Referring to the air flow direction A in FIGS. 4, 9, 11, 12, 16a, 19, and 23a to 24b, the robot cleaner 100 or 200 includes an air channel P110 or P210 for discharging air from the sliding module 130 or 230 to the outside through the body 110 or 210 in the state in which the sliding module 130 or 230 is coupled to the body 110 or 210. The robot cleaner 100 or 200 includes a first channel end 110a or 210a, disposed such that the air in the collection portion 133 or 233 can be introduced, and a second channel end 110b or 210b, disposed at a position different from the position at which the first channel end 110a or 210a is disposed. The second channel end 110b or 210b is exposed to external air. The air channel P110 or P210 interconnects the first channel end 110a or 210a and the second channel end 110b or 210b. When the robot cleaner 100 or 200 moves forward, therefore, relatively bulky foreign matter is easily introduced into the collection portion 133 or 233 (B1). Specifically, when the sliding module 130 or 230 moves forward, air flows relatively rearward, whereby the foreign matter D may be easily introduced into the collection portion. In addition, micro-scale foreign matter may be completely removed by the mop unit M1 or the replaceable mop M2 due to the formation of the air channel. Specifically, if the sliding module 130 or 230 moves forward while contacting the floor G in the state in which the air channel is not provided, air flow from the front side of the sliding module 130 or 230 to the left and right sides of the sliding module 130 or 230. Micro-scale foreign flatter may fly away due to this flow of air. In the state in which the air channel is provided, however, the flow of air is weakened, and the air flows to the mops M1 and M2, whereby micro-scale foreign matter may be completely removed by mopping.

The body 110 or 210 has a body gap 110c or 210c. The outer surface of the body 110 or 210 is recessed to form the body gap 110c or 210c. The lower surface of the body 110 or 210 between the traveling module 30 and the sliding module 130 or 230 is recessed upward to form the body gap 110c or 210c.

The first channel end 110a or 210a is disposed at a position corresponding to the module hole 130a or 230a. The second channel end 110b or 210b forms an opening in the outer surface of the body 110 or 210. The second channel end 110b or 210b is disposed so as to be exposed to external air in the state in which the sliding module 130 or 230 is coupled to the body 110 or 210. When the sliding module 130 or 230 moves forward while sliding on the floor therefore, the flow of air may be guided from the collection portion 133 or 233 to the second channel end 110b or 210b in the outer surface of the body 110 or 210.

The second channel end 110b or 210b is disposed at a position facing the body gap 110c or 210c. Consequently, the effect of air generated in the environment around the robot cleaner 100 or 200 during the movement of the robot cleaner 100 or 200 is lessened, and air can flow through the air channel P110 or P210 in a predetermined air flow direction A. For example, in the case in which the second channel end 110b or 210b is not disposed at a position hidden by the body gap 110c or 210c, air may be introduced into the second channel end 110b or 210b by a fan during the travel of the robot cleaner 100 or 200. That is, air may flow in the direction opposite the predetermined air flow direction A. As a result, the opposite effect may instantaneously occur. In the case in which the second channel end 110b or 210b is disposed at a position facing the body gap 110c or 210c, air is prevented from directly colliding with the second channel end 110b or 210b.

The robot cleaner 100 or 200 may include a fan 40 for applying pressure to the air flowing in the air channel P110 or P210. The fan 40 may apply pressure to the air such that the air can flow in the air flow direction A during the travel of the robot cleaner 100 or 200 for mopping. Meanwhile, the fan may apply pressure to air such that the air can flow the reverse direction Ar when the collected foreign matter D is removed by a maintenance device 300, a description of which will follow (see FIGS. 25a and 25b).

In the first embodiment (see FIGS. 4, 11, 12, and 16a), the module hole 130a or 230a is vertically formed through the guide protrusion 137b. The first channel end 110a is formed in the upper surface of the guide 117b. The second channel end 110b is disposed at the rear of the module location portion 119. The second channel end 110b is disposed at the front surface, at which the body gap 110c is partitioned. The second channel end 110b is disposed so as to face the rear lower side (between the rear side and the lower side). Two second channel ends 110b, spaced apart from each other in the leftward-rightward direction, are provided. The air channel P110 extends through the body 110. Air introduced through the module hole 130a moves to the second channel end 110b via the air channel P110 in the body 110 through the first channel end 110a and is then discharged to the outside (see the arrow A).

In the second embodiment (see FIGS. 9, 19, and 23a to 24a), the module hole 230a also serves as a guide. The first channel end 210a is formed at the lower end of the guide protrusion 217. The second channel end 210b is disposed higher than the upper end of the guide protrusion 217. The second channel end 210b is disposed at the upper side of the module location portion 219. The second channel end 210b is disposed at the lower surface, at which the body gap 210c is partitioned. The second channel end 210b is disposed so as to face upward. Two first channel ends 210a, spaced apart from each other in the leftward-rightward direction, are provided. Correspondingly, two second channel ends 210b, spaced apart from each other in the leftward-rightward direction, are provided. Correspondingly, two air channels P210, spaced apart from each other in the leftward-rightward direction, are provided. The air channels P210 extend through the body 210. The air channels P210 vertically extend through the guide protrusion 217. Air introduced through the module hole 230a moves to the second channel ends 210b via the air channels P210 in the body 210 through the first channel ends 210a and is then discharged to the outside (see the arrow A).

Figure 15A:
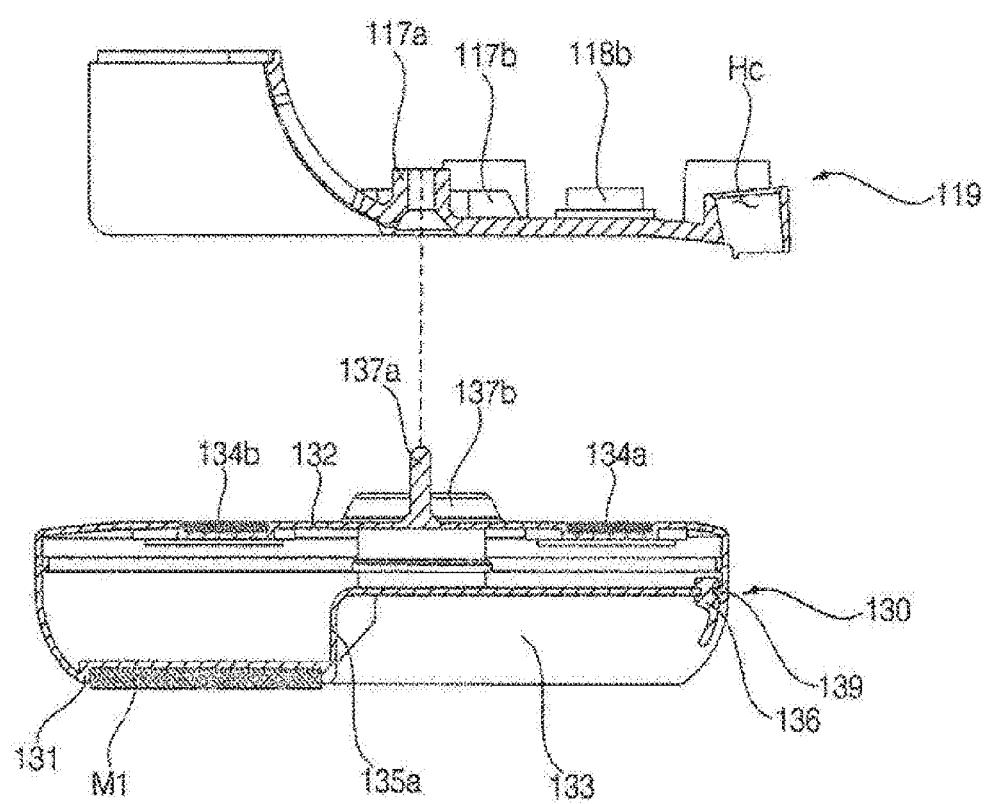
Figure 15B:
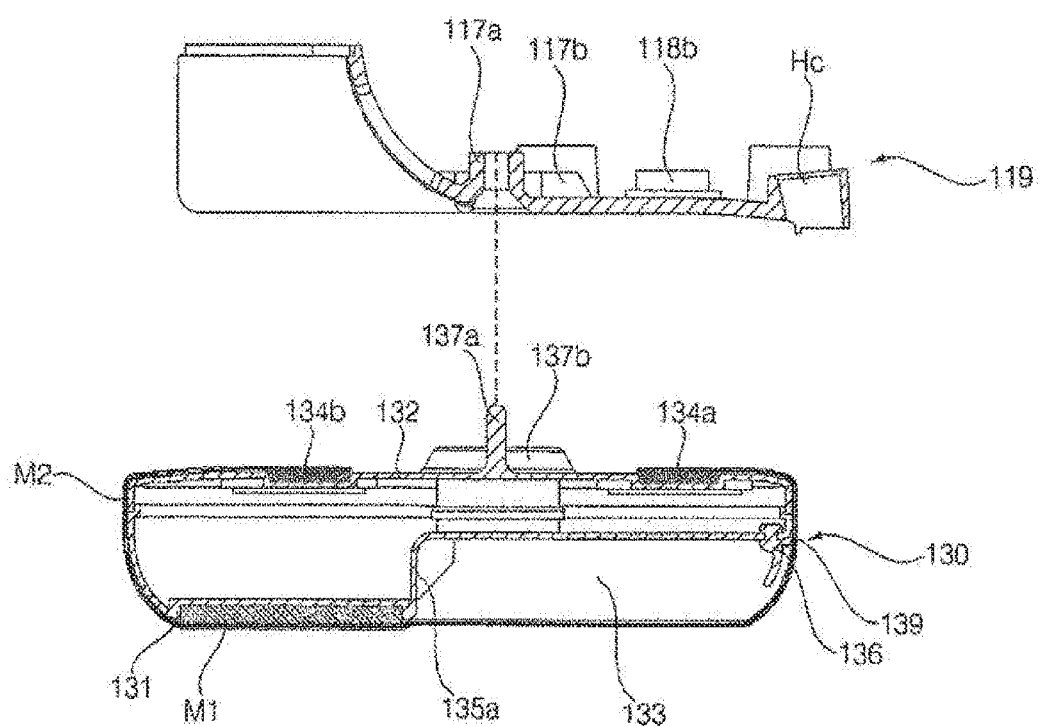
Figure 15C:
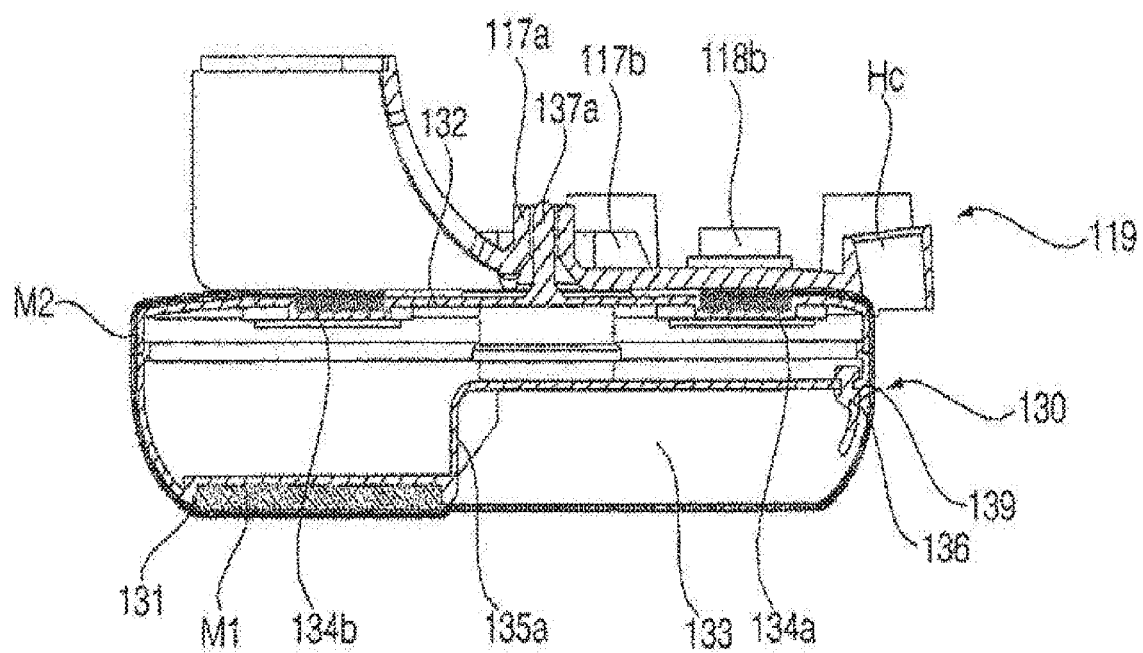

The process in which the module location portion 119 or 219 is coupled to the body location portion 132 or 232 will be described with reference to FIGS. 15a to 15c. Before the guide protrusion 137 or 217 is inserted into the guide 117 or 230a, the replaceable mop M2 may be fixed to the mop fixing unit 134 or 234. Alternatively, the guide protrusion 137 or 217 may be inserted into the guide 117 or 230a without the replaceable mop M2. In the former case, the sliding module 130 or 230 may perform a mopping operation using the replaceable mop M2. In the latter case, the sliding module 130 or 230 may perform a mopping operation sing the mop unit M1. The guide protrusion 137 or 217 is inserted into the guide 117 or 230a, whereby the module location portion 119 or 219 is coupled to the body location portion 132 or 232 at a predetermined position. The coupling between the module location portion 119 or 219 and the body location portion 132 or 232 is maintained by the coupling force between the coupling unit 138 or 238 and the corresponding coupling unit 118 or 218. The guide protrusion 137 or 217 and the guide 117 or 230a guide the sliding module 130 or 230 such that the sliding module 130 or 230 is separated from or coupled to the body 110 or 210 while moving in the upward-downward direction. When the body 110 or 210 moves in the forward-rearward direction in the state in which the sliding module 130 or 230 is coupled to the body 110 or 210 while contacting the floor G, the sliding module 130 or 230 moves in the forward-rearward direction together with the body 110 or 210 without being separated from the body 110 or 210 by the guide protrusion 137 or 217 and the guide 117 or 230a. In the case in which the replaceable mop M2 is fixed to the mop fixing unit 134, the module location portion 119 or 219 pushes the replaceable mop M2 when the guide protrusion 137 or 217 is inserted into the guide 117 or 230a. In this case, the replaceable mop M2 is caught between the module location portion 119 or 219 and the body location portion 132 or 232, whereby the replaceable mop M2 is more strongly fixed to the sliding module 130 or 230. In particular, at least a portion of the load of the body 110 or 210 is transmitted to the floor G via the sliding module 130 or 230. At this time, the load of the body 110 or 210 acts as coupling force for fixing the replaceable mop M2.

The cleaning process of the robot cleaner 100 or 200 using the collection portion 133 or 233 and the replaceable mop M2 will be described with reference to FIGS. 16a, 16b, 23a, and 23b.

Referring to FIG. 16a or 23a, when the sliding module 130 or 230 moves forward (Vf) according to the movement of the body 110 or 210, foreign matter D moves rearward relative to the sliding module 130 or 230 (B1). A portion of the replaceable mop M2 wrapping the collection portion 133 or 233 is spaced apart from the floor G so as to form a space, and the foreign matter D is introduced into the space. A portion of the replaceable mop M2 wrapping the collection portion 133 or 233 is recessed into the collection space, and the introduced foreign matter D is located in the collection space. A portion of the introduced foreign matter having a relatively small volume clings to another portion of the replaceable mop M2 disposed at the lower side of the bottom portion 131 or 231. That is, a front portion of the lower part of the replaceable mop M2 collects bulky foreign matter D, and a rear portion of the lower part of the replaceable mop M2 performs a mopping operation in the state of being in tight contact with the floor G. At this time, the auxiliary collection member 136 or 236 is curved rearward or rotated rearward, whereby the distance between the lower end of the auxiliary collection member 136 or 236 and the floor G is increased. As a result, the front part of the replaceable mop M2 may be easily recessed in the collection space. Consequently, the bulky foreign matter D can be easily introduced into the collection space.

Figure 16B:
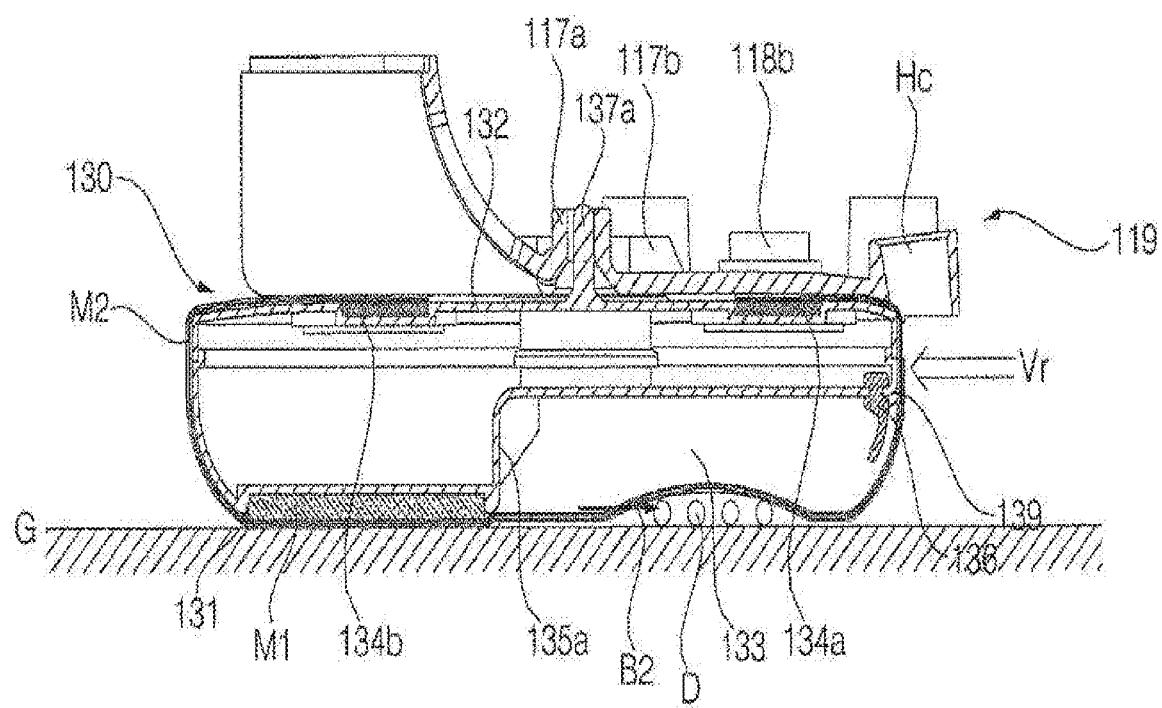
Figure 17:
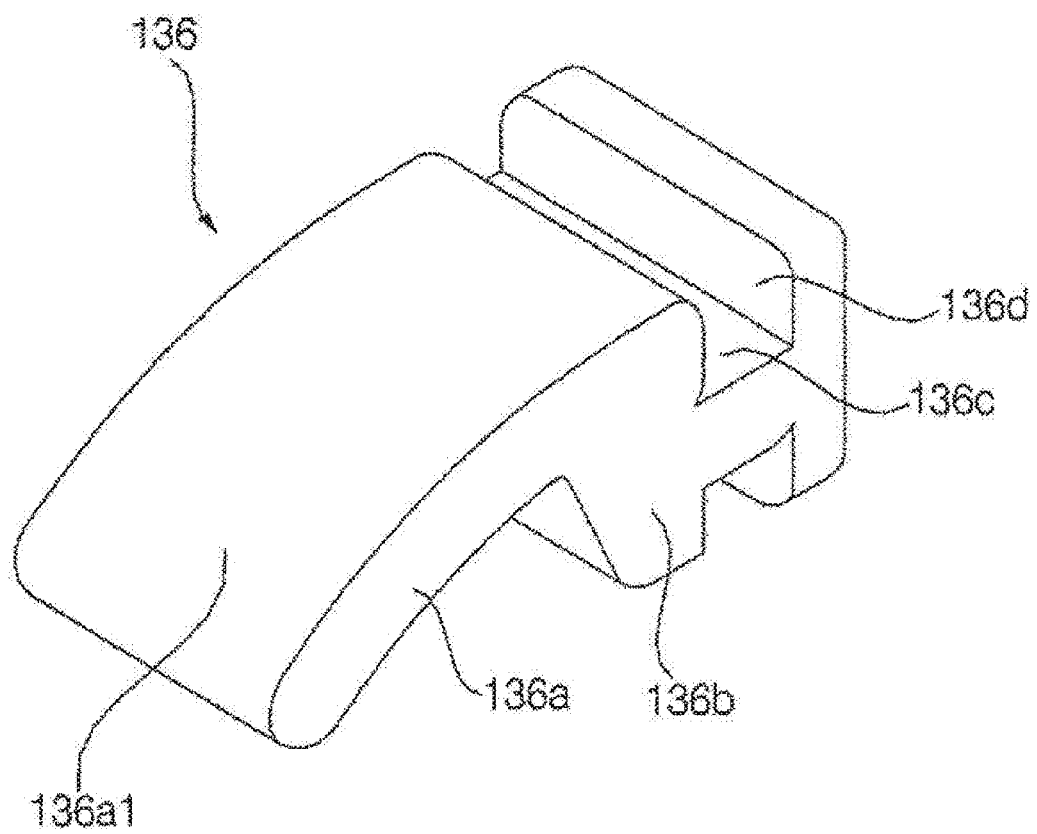
FIG. 17 is a perspective view of an auxiliary collection member of FIG. 4.
Figure 18:
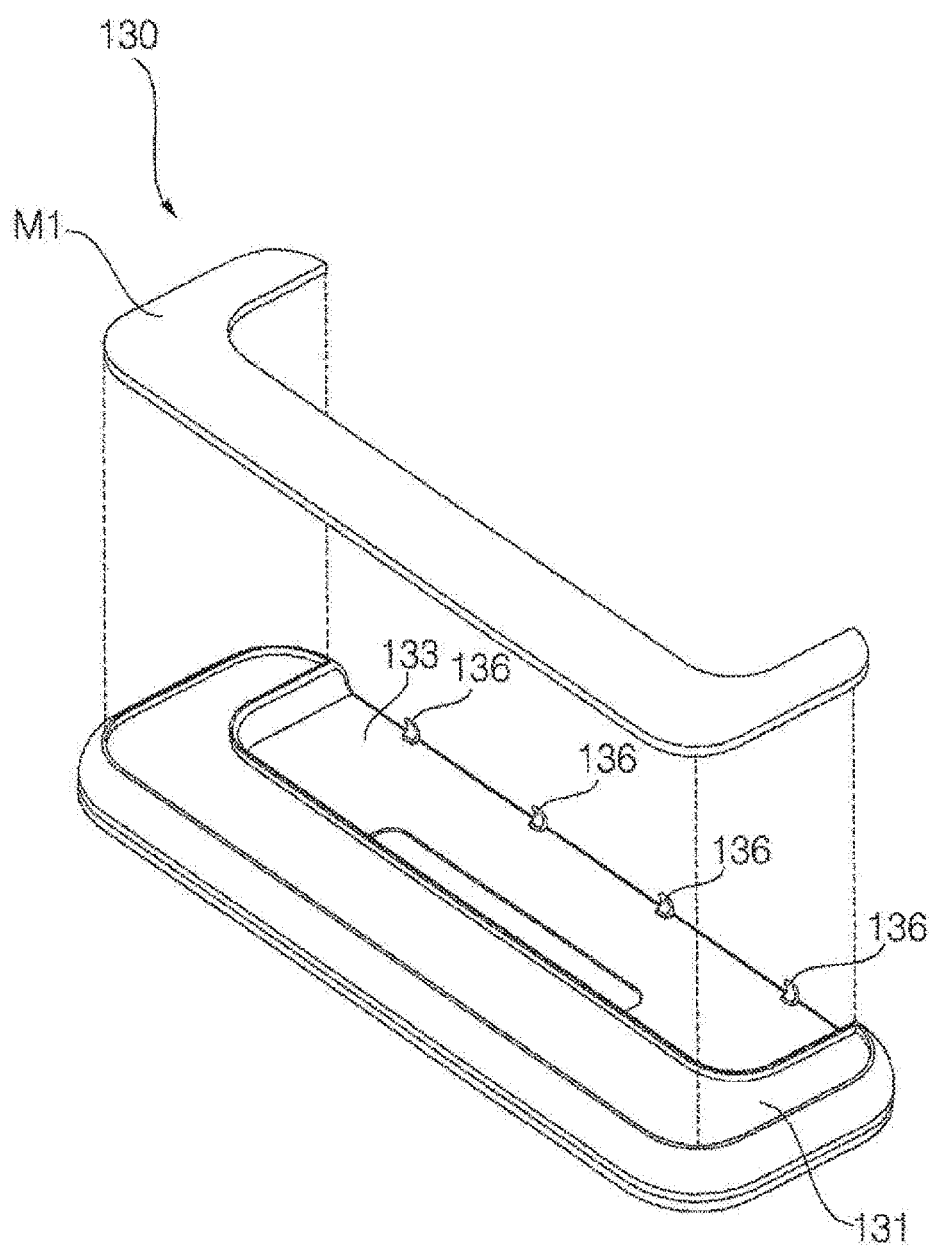
FIG. 18 is an exploded perspective view of the sliding module of FIG. 4, from a mop unit is separated.
Figure 19:
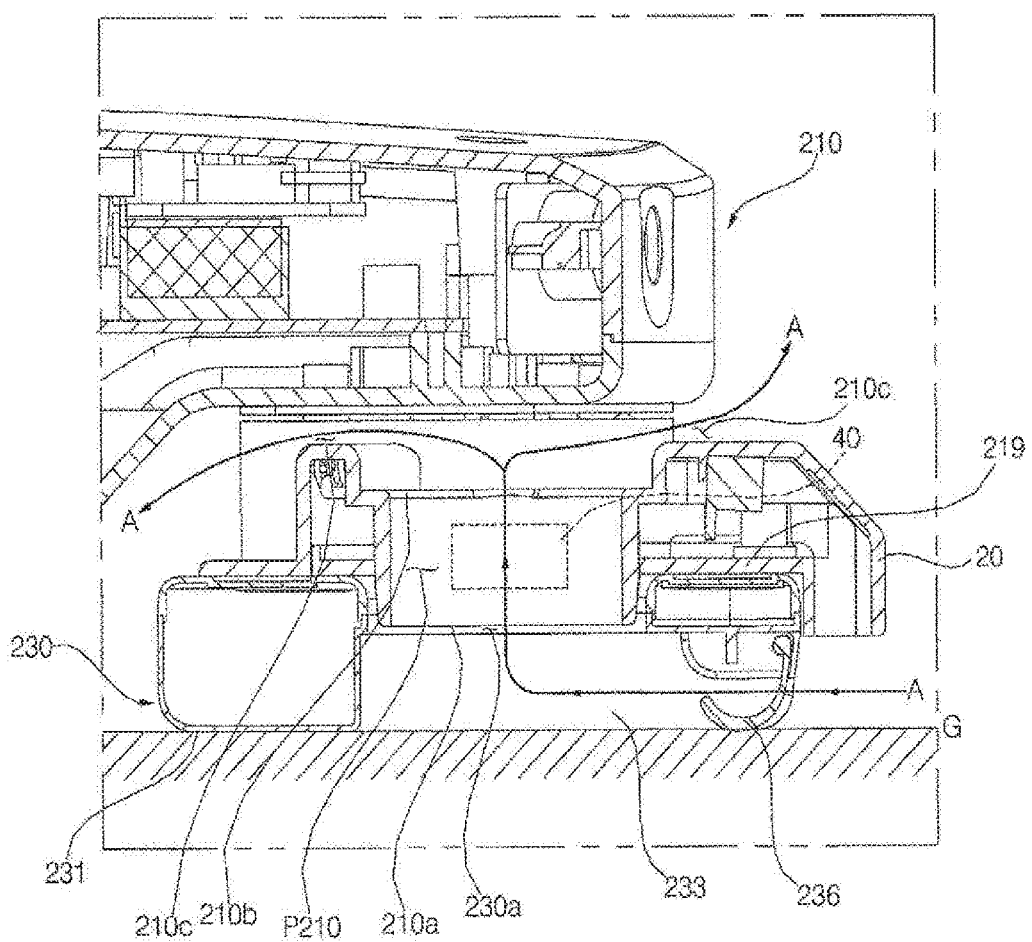
FIG. 19 is a partial sectional view taken along line S2-S2' of FIG. 10.
Figure 20:
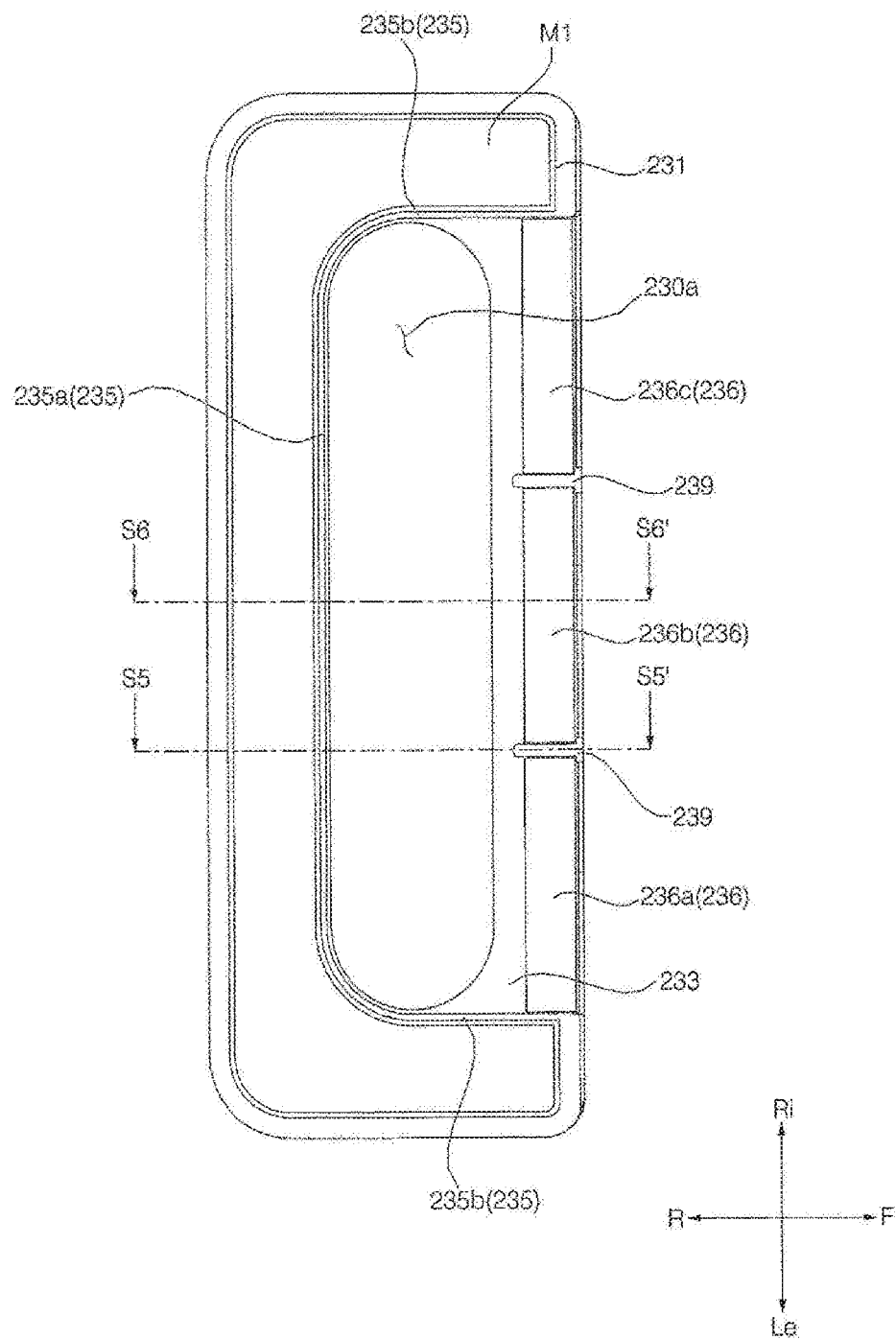
FIG. 20 is a bottom elevation view showing the sliding module of FIG. 9.
Figure 21:
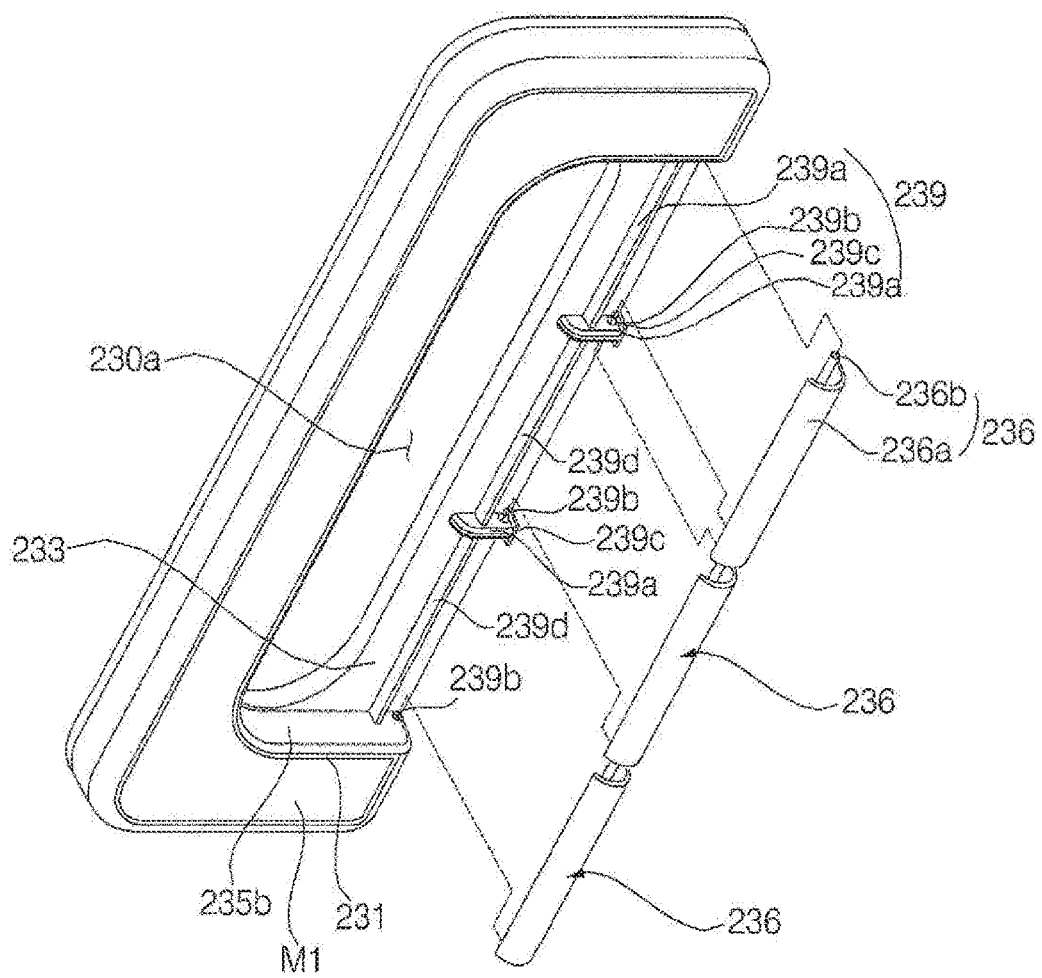
FIG. 21 is an exploded perspective view of the sliding module of FIG. 20, from which the auxiliary collection member is separated.
Figure 22:
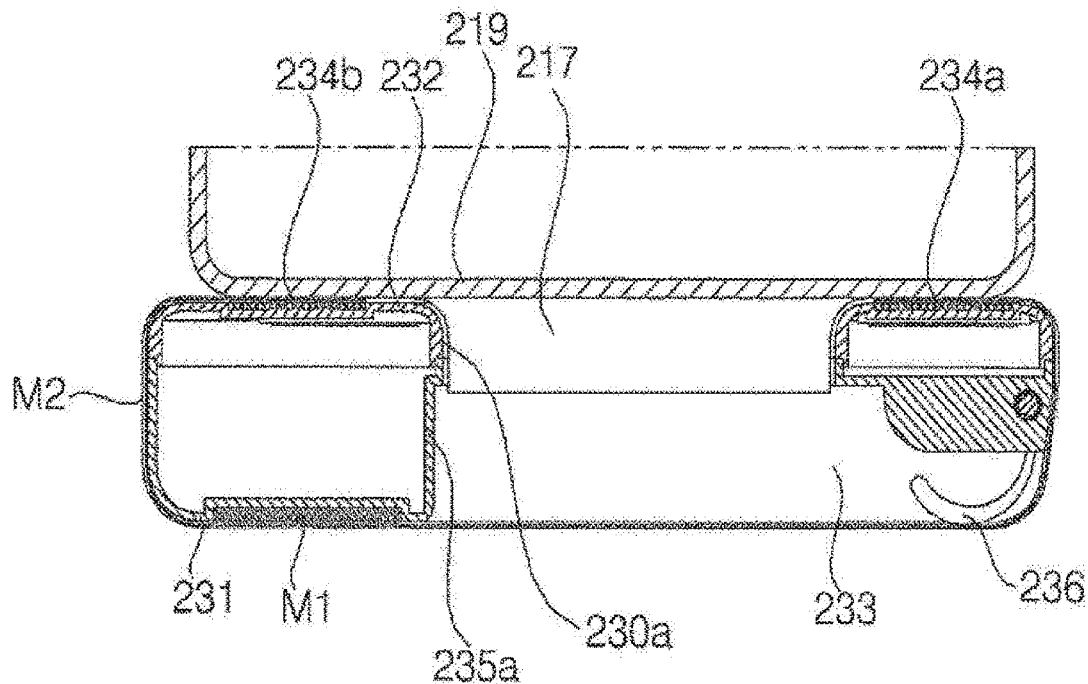
FIG. 22 is a sectional view taken along line S5-S5' of FIG. 20 in the state in which the sliding module is coupled to the module location portion.
Figure 23B:
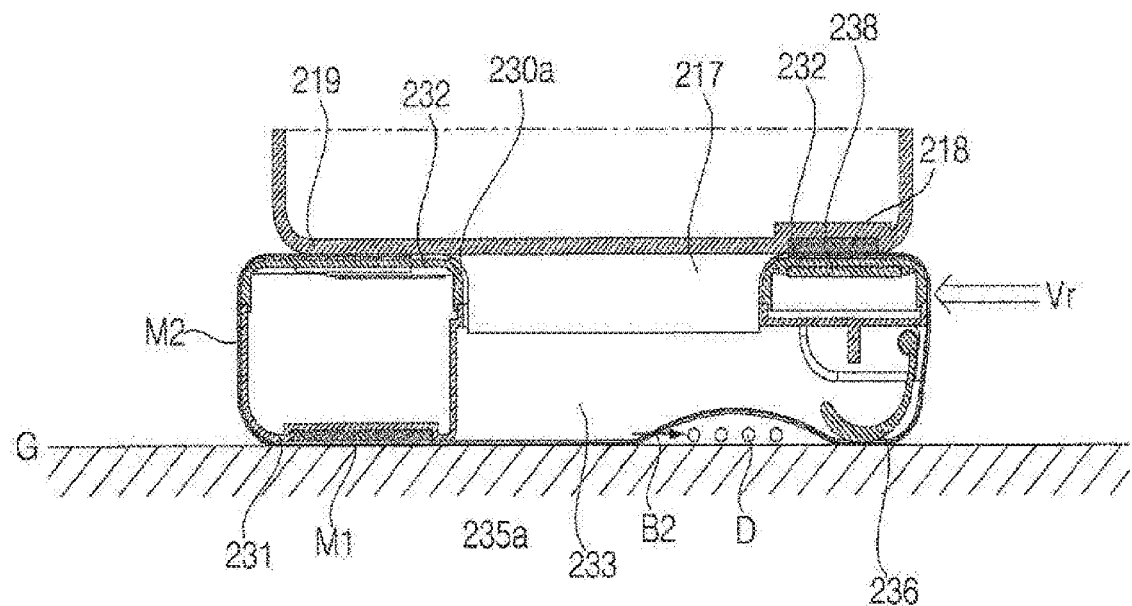

Referring to FIG. 16b or 23b, a portion of the replaceable mop M2 wrapping the collection portion 133 or 233 is spaced apart from the floor G so as to form a space, and relatively bulky foreign matter D is located in the space. When the sliding module 130 or 230 moves rearward (Vr) according to the movement of the body 110 or 210, foreign matter D tends to move forward relative to the sliding module 130 or 230 (B2). At this time, it is difficult for the auxiliary collection member 136 or 236 to be curved forward or rotated forward any further, whereby the distance between the lower end of the auxiliary collection member 136 or 236 and the floor G is decreased. As a result, it is difficult for a gap to be formed between the front end of the replaceable mop M2 and the floor G, whereby it is difficult for the foreign matter D located in the collection space to be discharged forward from the collection space. Of course, even during this process, the rear portion of the lower part of the replaceable mop M2 performs a mopping operation in the state of being in tight contact with the floor G.

The cleaning process of the robot cleaner 100 or 200 using the collection portion 133 or 233 and the mop unit M1 will be described with reference to FIGS. 24a and 24b.

Referring to FIG. 24a, when the sliding module 130 or 230 moves forward (Vf) according to the movement of the body 110 or 210, foreign matter D moves rearward relative to the sliding module 130 or 230 (B1). As a result, the foreign matter D is introduced into the collection space in the collection portion 133 or 233 and is located in the collection space. A portion of the introduced foreign matter having a relatively small volume clings to the mop unit M1 provided at the bottom portion 131 or 231. That is, the collection portion 133 or 233 collects bulky foreign matter D in front of the mop unit M1, and the mop unit M1 performs a mopping operation in the state of being in tight contact with the floor G. At this time, the auxiliary collection member 136 or 236 is curved rearward or rotated rearward, whereby the distance between the lower end of the auxiliary collection member 136 or 236 and the floor G is increased. As a result, the bulky foreign matter D can be easily introduced into the collection space.

Figure 24B:
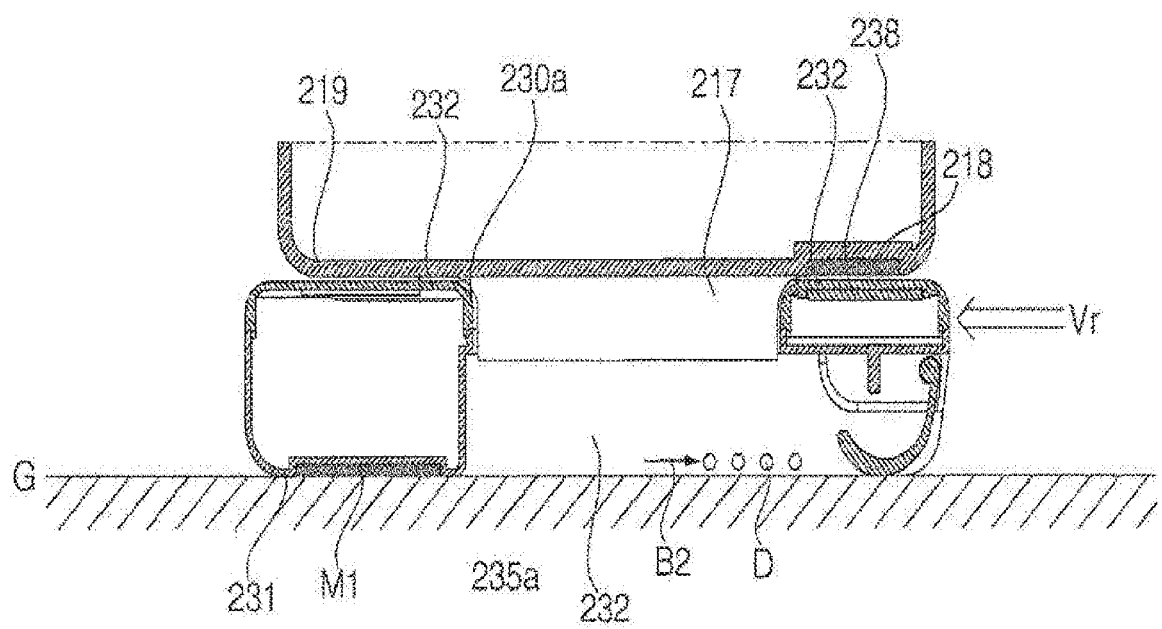

Referring to FIG. 24b, relatively bulky foreign matter D is located in the collection space in the collection portion 133 or 233. When the sliding module 130 or 230 moves rearward (Vr) according to the movement of the body 110 or 210, foreign matter D tends to move forward relative to the sliding module 130 or 230 (B2). At this time, it is difficult for the auxiliary collection member 136 or 236 to be curved forward or rotated forward any further, whereby the distance between the lower end of the auxiliary collection member 136 or 236 and the floor G is decreased. As a result, it is difficult for the foreign matter D located in the collection space to be discharged forward from the collection space. Of course, even during this process, the mop unit M1 performs a mopping operation in the state of being in tight contact with the floor G.

Figure 25A:
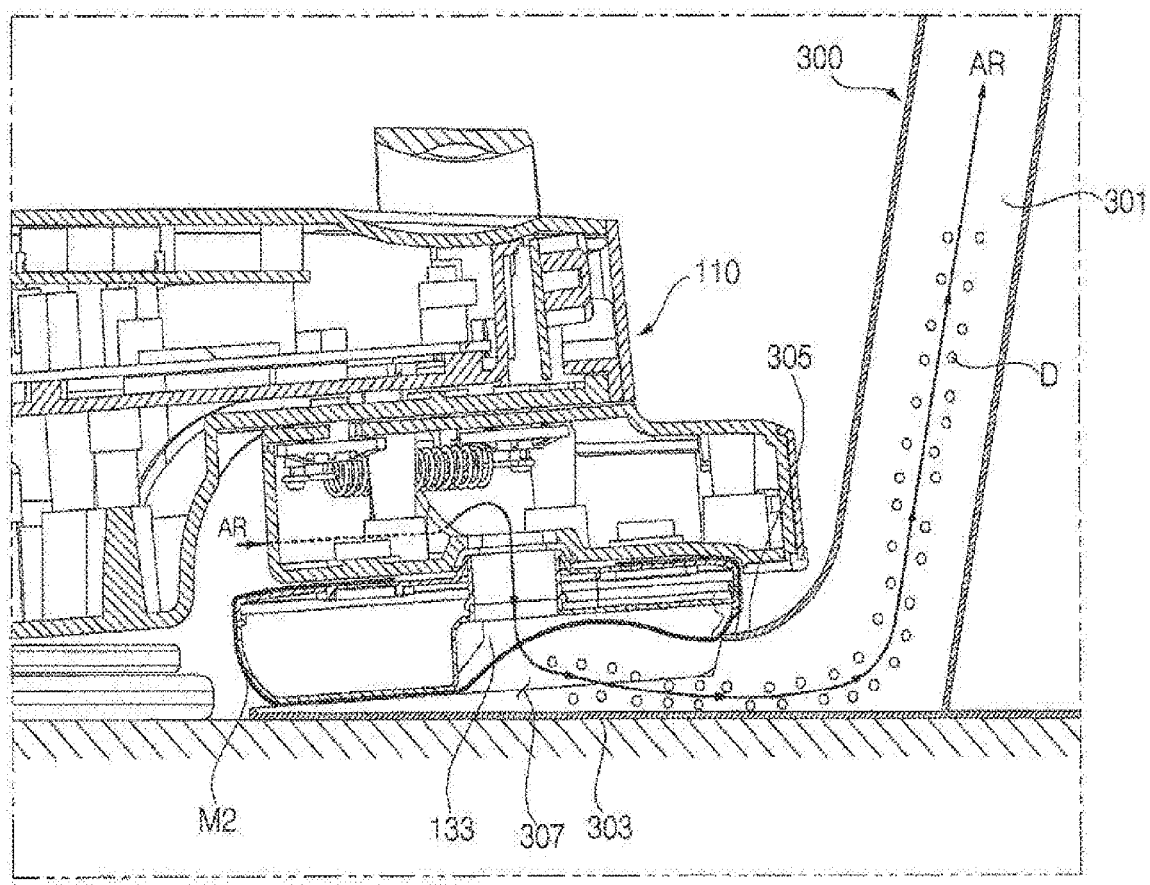
Figure 25B:
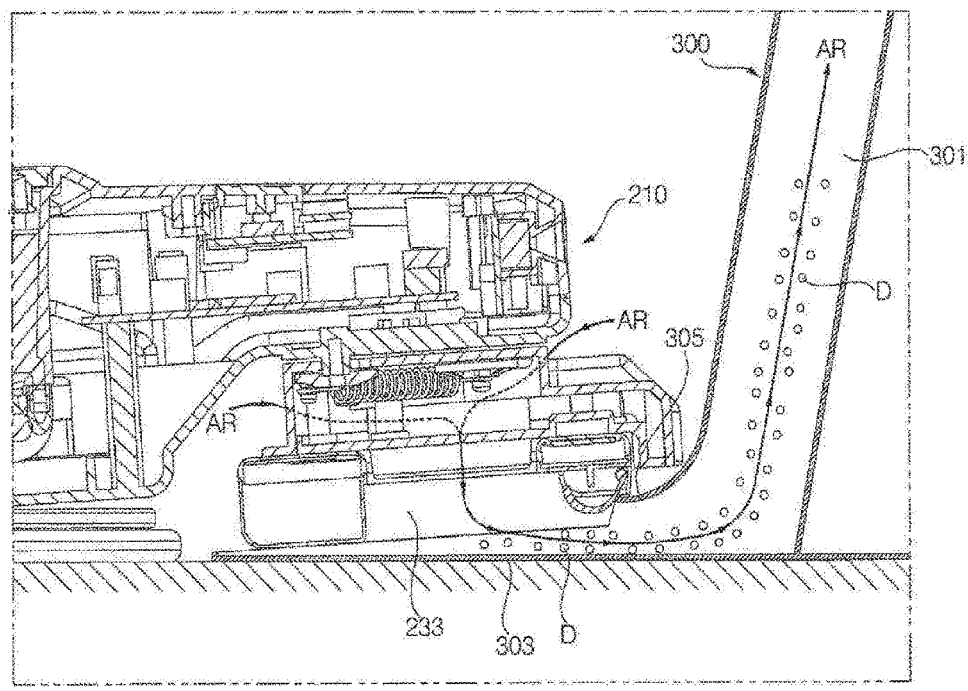

Referring to FIGS. 25a and 25b, a maintenance device 300 according to an embodiment of the present invention maintains the robot cleaner 100 or 200. The maintenance device 300 may charge the robot cleaner 100 or 200. The maintenance device 300 may clean the robot cleaner 100 or 200. The maintenance device 300 may wash the mop M1 or M2 of the robot cleaner 100 or 200. The maintenance device 300 may remove foreign matter D from the collection portion 133 or 233 of the robot cleaner 100 or 200.

The maintenance device 300 includes a case (not shown), which defines the external appearance thereof. The maintenance device 300 includes a base 303 for supporting the maintenance device 300 in the state of being in contact with the floor G. The maintenance device 300 includes a suction port 307, through which foreign matter D is introduced. The suction port 307 is inserted into the collection portion 133 or 233. The maintenance device 300 includes a suction channel 301 for guiding the movement of the air suctioned through the suction port 307. The maintenance device 300 includes an open guide unit 305 for pushing the auxiliary collection member 136 or 236 rearward in the state in which the suction port 307 is inserted into the collection portion 133 or 233. The open guide unit 305 enables the auxiliary collection member 136 or 236 to be curved rearward or to be rotated rearward. The maintenance device 300 may include a foreign matter storage unit (not shown) for storing the foreign matter that has moved through the suction channel 301. The maintenance device 300 may include a maintenance fan (not shown) for applying pressure to the air passing through the suction channel 301.

The process in which the robot cleaner 100 or 200 performs a mopping operation using the replaceable mop M2 and in which foreign matter D is then removed from the collection portion 133 or 233 by the maintenance device 300 will be described with reference to FIG. 25a. The suction port 307 of the maintenance device 300 is inserted into the collection space. At this time, the open guide unit 305 pushes the auxiliary collection member 136 or 236 rearward such that the front side of the collection space is open. The fan 40 of the robot cleaner 100 or 200 or the maintenance fan of the maintenance device 300 is operated to apply pressure to air such that the air can flow in the reverse direction Ar. (The fan 40 may be configured to be rotated in the forward direction and the reverse direction.) External air is introduced into the air channel P110 or P210 through the second channel end 110b or 210b, and is then introduced into the collection space through the first channel end 110a or 210a. The air introduced into the collection space passes through the replaceable mop M2, and then passes through the suction port 307 together with foreign matter D collected at the lower side of the replaceable mop M2. The air and the foreign matter D that have passed through the suction port 307 move along the suction channel 301.

The process in which the robot cleaner 100 or 200 performs a mopping operation using the mop unit M1 and in which foreign matter D is then removed from the collection portion 133 or 233 by the maintenance device 300 will be described with reference to FIG. 25b. The suction port 307 of the maintenance device 300 is inserted into the collection space. At this time, the open guide unit 305 pushes the auxiliary collection member 136 or 236 rearward such that the front side of the collection space is open. The fan 40 of the robot cleaner 100 or 200 or the maintenance fan of the maintenance device 300 is operated to apply pressure to air such that the air can flow in the reverse direction Ar. (The fan 40 may be configured to be rotated in the forward direction and the reverse direction.) External air is introduced into the air channel P110 or P210 through the second channel end 110b or 210b, and is then introduced into the collection space through the first channel end 110a or 210a. The air introduced into the collection space passes through the suction port 307 together with foreign matter D collected in the collection space. The air and the foreign matter D that have passed through the suction port 307 move along the suction channel 301.

As is apparent from the above description, the robot cleaner has the effect of performing a more efficient and thorough mopping operation.

In addition, it is possible to easily replace the mop of the robot cleaner using the sliding module, which is detachable, and the mop fixing unit for fixing the replaceable mop.

In addition, the mop fixing unit is disposed between the module location portion and the body location portion. Consequently, the replaceable mop is caught between the body and the sliding module, whereby the replaceable mop is strongly fixed to the sliding module.

In addition, the sliding module supports the body, or the module location portion and the body location portion are disposed so as to face each other vertically. Consequently, the replaceable mop is more strongly fixed to the mop fixing unit when the load of the body is transmitted to the sliding module. Furthermore, frictional force is increased when a mopping operation is performed by the sliding module, whereby the mopping operation is more efficiently performed.

In addition, the module location portion or the body location portion is configured to push the mop fixing unit, whereby it is possible to more strongly fix the replaceable mop.

The mop fixing unit is disposed at the body location portion. In the state in which the sliding module is separated from the body, therefore, a user may pick up the sliding module and may replace the replaceable mop, whereby user convenience is improved. Furthermore, the replaceable mop is fixed to the sliding module so as to wrap the sliding module, whereby easy fixing is achieved.

In addition, it is possible to prevent the replaceable mop from being separated from between the body and the sliding module by the provision of the friction-forming surface.

In addition, the separation and coupling between the body and the sliding module are guided by the guide protrusion and the guide, and the body pushes the sliding module horizontally while the body and the sliding module are fixed to each other so as not to be separated from each other during the travel of the robot cleaner.

Since the front mop fixing unit and the rear mop fixing unit are provided, it is possible to fix one end of the replaceable mop in front of the guide protrusion and the guide and to fix the other end of the replaceable mop at the rear of the guide protrusion and the guide. Consequently, it is possible to fix the replaceable mop to the sliding module in a manner of wrapping the sliding module.

Since the coupling unit and the corresponding coupling unit are provided, it is possible to achieve the coupling between the body and the sliding module and to more strongly fix the replaceable mop caught between the body and the sliding module.

The air channel is provided. When the sliding module moves forward in the state of being in contact with the floor, therefore, the flow of air moving around the contact area is weakened, whereby it is possible to prevent micro-scale foreign matter from flying away along with the flow of air. In addition, the flow of air introduced into the surface of the mop is formed, whereby the micro-scale foreign matter is more efficiently removed by mopping.

The collection portion is provided. When the robot cleaner moves forward, therefore, bulky or heavy foreign matter, which does not cling to the surface of the mop, is collected into the space in the collection portion.

The second channel end is disposed at a position facing the body gap. Consequently, the effect of air generated in the environment around the robot cleaner during the movement of the robot cleaner is less, and air can flow through the air channel in a predetermined air flow direction. For example, in the case in which the second channel end is not disposed at a position hidden by the body gap, air may be introduced into the second channel end by the fan during the travel of the robot cleaner. That is, air may flow in the direction opposite the predetermined air flow direction. As a result, the opposite effect may instantaneously occur. In the case in which the second channel end is disposed at a position facing the body gap, air is prevented from directly colliding with the second channel end, whereby it is possible to prevent the occurrence of the opposite effect.

Since the bumper and the cliff sensor are provided, it is possible to prevent the sliding module from being separated from the body due to impacts or a cliff during the travel of the robot cleaner.

What is claimed is:

1. A robot cleaner comprising:
   a body having a module location portion;
   a traveling module configured to move the body; and
   a sliding module having a body location portion detachably coupled to the module location portion, and being configured to slide along a floor when the body is moved, wherein
   a mop fixing unit for fixing a replaceable mop is provided between the module location portion and the body location portion, and
   wherein the traveling module comprises a left spin-mop and a right spin-mop configured to contact the floor while rotating in a clockwise direction or in a counter-clockwise direction when viewed from upper side.

2. The robot cleaner according to claim 1, wherein the sliding module supports the body.

3. The robot cleaner according to claim 1, wherein
   the module location portion has a surface that faces downward, and
   the body location portion has a surface that faces upward.

4. The robot cleaner according to claim 1, wherein the module location portion or the body location portion is configured to push the mop fixing unit in a state in which the sliding module is coupled to the body.

5. The robot cleaner according to claim 1, wherein the mop fixing unit is disposed at the body location portion.

6. The robot cleaner according to claim 1, wherein the mop fixing unit has a friction-forming surface that provides relatively high frictional force in a state in which the mop is in contact with the friction-forming surface.

7. The robot cleaner according to claim 1, wherein any one of the module location portion and the body location portion is provided with a guide protrusion having a vertically protruding portion, and the other of the module location portion and the body location portion is provided with a guide, into which the guide protrusion is inserted.

8. The robot cleaner according to claim 7, wherein the mop fixing unit comprises:
   a front mop fixing unit disposed in front of the guide protrusion and the guide; and
   a rear mop fixing unit disposed at a rear of the guide protrusion and the guide.

9. The robot cleaner according to claim 8, wherein
   the sliding module comprises a coupling unit disposed at the body location portion,
   the body comprises a corresponding coupling unit disposed at the module location portion at a position corresponding to the coupling unit, the corresponding coupling unit being coupled to the coupling unit to generate coupling force, and
   the coupling unit comprises:
      a front coupling unit disposed on a same axis in a leftward-rightward direction as the front mop fixing unit or disposed further forward than the front mop fixing unit; and
      a rear coupling unit disposed on a same axis in a leftward-rightward direction as the rear mop fixing unit or disposed further rearward than the rear mop fixing unit.

10. The robot cleaner according to claim 7, wherein an air channel that penetrates the guide protrusion and the guide is formed.

11. The robot cleaner according to claim 1, wherein
    the sliding module comprises a coupling unit disposed at the body location portion,
    the body comprises a corresponding coupling unit disposed at the module location portion at a position corresponding to the coupling unit, and
    any one of the coupling unit and the corresponding coupling unit comprises a magnet and the other of the coupling unit and the corresponding coupling unit comprises a material that is attracted by the magnet.

12. The robot cleaner according to claim 11, wherein
    any one of the module location portion and the body location portion is provided with a guide protrusion, and the other of the module location portion and the body location portion is provided with a guide, into which the guide protrusion is inserted, and
    the coupling unit comprises a front coupling unit disposed in front of the guide protrusion and the guide and a rear coupling unit disposed at a rear of the guide protrusion and the guide.

13. The robot cleaner according to claim 1, wherein the sliding module comprises a collection portion recessed in front of a lower side thereof so as to form a space spaced apart from the floor.

14. The robot cleaner according to claim 1, further comprising an air channel for discharging air introduced from the sliding module to an outside through the body in a state in which the sliding module is coupled to the body.

15. The robot cleaner according to claim 1, wherein
    the sliding module is provided with a module hole formed to penetrate the body location portion, and
    the body is provided with an air channel for interconnecting a first channel end, disposed at a position corresponding to the module hole, and a second channel end, disposed to be exposed to external air in a state in which the sliding module is coupled to the body.

16. The robot cleaner according to claim 15, wherein
    an outer surface of the body is recessed to form a body gap, and
    the second channel end is disposed at a position facing the body gap.

17. The robot cleaner according to claim 1, wherein the body comprises:
    a bumper disposed in front of the module location portion; and
    a cliff sensor sensing if there is a cliff in front of the module location portion.

18. The robot cleaner according to claim 1, further comprising:
    a water supply module configured to supply water to the traveling module, wherein
    the traveling module is configured to perform a wet mopping operation, and
    the sliding module is configured to perform a dry mopping operation.

* * * * *